US008891519B2

(12) United States Patent
DelRegno et al.

(10) Patent No.: US 8,891,519 B2
(45) Date of Patent: Nov. 18, 2014

(54) SYSTEM AND METHOD FOR MONITORING, CONTROLLING AND PROVISIONING A TELECOMMUNICATIONS ACCESS NETWORK

(75) Inventors: Nick DelRegno, Rowlett, TX (US); Scott R. Kotrla, Wylie, TX (US); David E. McDysan, Great Falls, VA (US); Michael U. Bencheck, Denison, TX (US); Matthew W. Turlington, Richardson, TX (US); Ross S. Hardin, Plano, TX (US); Richard C. Schell, Allen, TX (US); Howard Chiu, Plano, TX (US); Lee D. Bengston, Murphy, TX (US); William Drake, Garland, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1386 days.

(21) Appl. No.: 10/858,868

(22) Filed: Jun. 2, 2004
(Under 37 CFR 1.47)

(65) Prior Publication Data
US 2006/0153070 A1    Jul. 13, 2006

Related U.S. Application Data

(60) Provisional application No. 60/560,009, filed on Apr. 5, 2004.

(51) Int. Cl.
*H04L 12/56* (2006.01)
*H04M 3/30* (2006.01)
*H04M 3/22* (2006.01)

(52) U.S. Cl.
CPC ............ *H04M 3/2254* (2013.01); *H04M 3/303* (2013.01); *H04M 3/301* (2013.01)
USPC .......................................................... 370/389

(58) Field of Classification Search
None
See application file for complete search history.

(56) References Cited

U.S. PATENT DOCUMENTS 5,566,161 A    10/1996  Hartmann et al.
6,006,275 A    12/1999  Picazo, Jr. et al.
(Continued)

FOREIGN PATENT DOCUMENTS

WO    01/93549    12/2001
WO    02/15475    2/2002

OTHER PUBLICATIONS

Zelig, et al., "Pseudo Wire(PW) Management Information Base," [on-line] [Last visited on: Jan. 26, 2004] http://www.ietf.org/internet-drafts/draft-ietf-pwe3-pw-mib-03, pp. 1-42.
Shah, et al., "Qos Signaling for PW," [on-line] [Last visited on: May 27, 2004] http://www.ietf.org/internet-drafts/draft-shah-pwe3-pw-qos-signaling-00, pp. 1-7.

(Continued)

*Primary Examiner* — Gregory Sefcheck

(57) ABSTRACT

An access device includes a first port configured to communicatively couple to a network node via a communications link, with the communications link having a plurality of information flows. At least one of the flows is configured as a maintenance and control flow and at least one of the flows is configured to carry customer data. The access device has a second port configured to communicatively couple to one or more demarcation devices via another communications link, and the demarcation device(s) is communicatively coupled to one or more customer premise equipment (CPE). A processing unit is configured to respond to commands received in the maintenance and control flow and to transmit access device information on the maintenance and control flow.

32 Claims, 18 Drawing Sheets

(56) References Cited

U.S. PATENT DOCUMENTS

| | | | |
|---|---|---|---|
| 6,115,603 A * | 9/2000 | Baird et al. | 455/401 |
| 6,320,867 B1 | 11/2001 | Bellenger et al. | |
| 6,480,533 B1 * | 11/2002 | Chu et al. | 375/222 |
| 6,542,660 B1 * | 4/2003 | Medin et al. | 385/24 |
| 6,728,238 B1 * | 4/2004 | Long et al. | 370/352 |
| 6,731,627 B1 * | 5/2004 | Gupta et al. | 370/352 |
| 6,834,060 B1 * | 12/2004 | Ward et al. | 370/522 |
| 7,088,714 B2 * | 8/2006 | Athreya et al. | 370/389 |
| 7,103,769 B1 * | 9/2006 | Fleming et al. | 713/151 |
| 7,124,197 B2 * | 10/2006 | Ocepek et al. | 709/232 |
| 7,136,372 B1 * | 11/2006 | Nilsen | 370/352 |
| 7,203,187 B1 * | 4/2007 | Richardson et al. | 370/352 |
| 7,239,636 B2 * | 7/2007 | Kadambi et al. | 370/395.2 |
| 7,330,888 B2 * | 2/2008 | Storry et al. | 709/224 |
| 7,352,853 B1 * | 4/2008 | Shen et al. | 379/201.12 |
| 7,448,076 B2 * | 11/2008 | Ocepek et al. | 726/11 |
| 7,499,999 B2 * | 3/2009 | Ocepek et al. | 709/225 |
| 7,561,571 B1 * | 7/2009 | Lovett et al. | 370/392 |
| 7,580,409 B1 * | 8/2009 | Swenson et al. | 370/392 |
| 7,746,799 B2 * | 6/2010 | Kokot et al. | 370/252 |
| 8,555,352 B2 * | 10/2013 | Moisand et al. | 726/5 |
| 8,559,444 B2 * | 10/2013 | Kokot et al. | 370/395.53 |
| 2002/0176404 A1 * | 11/2002 | Girard | 370/352 |
| 2003/0233450 A1 | 12/2003 | Carley | |
| 2003/0233583 A1 | 12/2003 | Carley | |
| 2004/0213155 A1 * | 10/2004 | Xu et al. | 370/232 |
| 2004/0258003 A1 * | 12/2004 | Kokot et al. | 370/254 |
| 2005/0008013 A1 | 1/2005 | Jamieson et al. | |
| 2005/0044262 A1 * | 2/2005 | Luo | 709/238 |

OTHER PUBLICATIONS

Bryant, et al., "PWE3 Architecture" [on-line] [Last visited on: May 27, 2004] http://www.ietf.org/internet-drafts/draft-ietf-pwe3-arch-06, pp. 1-34.

Xiao, et al., "Requirements for Pseudo-Wire Emulation Edge-to-Edge (PWE3)," [on-line] [Last visited on: Jan. 17, 2004] http://www.ietf.org/internet-drafts/draft-ietf-pwe3-requirements-08,. pp. 1-20.

Martini, et al., "Pseudowire Setup and Maintenance Using LDP," [on-line] [Last visited on: Jun. 1, 2004] http://www.ietf.org/internet-drafts/draft-ietf-pwe3-control-protocol-06, pp. 1-31.

Zelig, et al., "Ethernet Pseudo Wire (PW) Management Information Base," [on-line] [Last visited on: Jan. 26, 2004] http://www.ietf.org/internet-drafts/draft-ietf-pwe3-enet-mib-03, pp. 1-21.

Zelig, et al., "Pseudo Wire (PW) Over MPLS PSN Management Information Base," [on-line] [Last visited on: Feb. 3, 2004] http://www.ietf.org/internet-drafts/draft-ietf-pwe3-pw-mpls-mib-04, pp. 1-25.

Nadeau, et al., "Pseudo Wire (PW) Virtual Connection Verification," [on-line] [Last visited on: May 27, 2004] http://www.ietf.org/internet-drafts/draft-oetf-pwe3-vccv-02, pp. 1-16.

Bonica, et al., "ICMP Extensions for Multiprotocol Label Switching," [on-line] [Last visited on: May 27, 2004] http://www.ietf.org/internet-drafts/draft-bonica-icmp-mpls-02, pp. 1-10.

Williams, Mark "Optical Ethernet Architecture Evolution: The Logical Provider Edge," Metro Ethernet Forum (Aug. 28, 2003) pp. 1-35.

Lang, Tao, "Making the Fiber Connection," Fiberoptic Product News, vol. 19, No. 2, Reed Electronic Group, New Jersey (Feb. 2004) 2 pages.

\* cited by examiner

Provisioning Example
Distributed View

SYSTEM AND METHOD FOR MONITORING, CONTROLLING AND PROVISIONING A TELECOMMUNICATIONS ACCESS NETWORK

PRIORITY CLAIM AND CROSS-REFERENCE TO RELATED APPLICATIONS

The present application claims priority to U.S. Provisional Patent Application Ser. No. 60/560,009, filed Apr. 5, 2004, entitled "System and Method for Using Labeled Flows in a Communications Access Network," assigned to the assignee of the present application and incorporated herein by reference its entirety.

The present application is also related to the following co-pending applications, which are assigned to the assignee of the present application and incorporated herein by reference in their entireties:

U.S. patent application Ser. No. 10/858,502, filed on Jun. 1, 2004 and entitled "System and Method for a Communications Access Network;"

U.S. patent application Ser. No. 10/858,501, filed on Jun. 1, 2004 and entitled "System and Method for Controlling Communication Flow Rates;"

U.S. patent application Ser. No. 10/858,491, filed on Jun. 1, 2004 and entitled "Apparatus and Method for Terminating Service Emulation Instances;"

U.S. patent application Ser. No. 10/858,503, filed on Jun. 1, 2004 and entitled "Method and Apparatus for Processing Labeled Flows in a Communications Access Network;" and U.S. patent application Ser. No. 10/858,517, filed on Jun. 1, 2004 and entitled "System and Method for Providing A Multiple-Protocol Crossconnect;"

U.S. patent application Ser. No. 10/859,057, filed concurrently herewith and entitled "Providing Applets to Remote Devices in a Communications Network;"

U.S. patent application Ser. No. 10/859,463, filed concurrently herewith and entitled "Error Detection and Reporting;"

U.S. patent application Ser. No. 10/859,468, filed concurrently herewith and entitled "Apparatus and Method for Testing and Fault Isolation in a Communication Network;" and U.S. patent application Serial No. 10/858525, filed on Jun. 1, 2004 and entitled "System and Method for Managing Communications In An Access Network."

TECHNICAL FIELD

This invention relates generally to telecommunications, and more particularly, to monitoring, control and provisioning network elements in an access telecommunications network.

BACKGROUND

A commercial telecommunications network operated by a service provider typically supports voice and/or data communications between various customer locations served by the network. An overall communications system may be subdivided into an access network and a core network, which may or may not be owned and operated by different service providers. Generally, customer devices communicatively couple to the access network which, in turn, connects to the core network. The access network includes what many people refer to as "the last mile," that is, the connectivity from a customer location, such as an office building, to a point where a service provider has significant facilities, such as a metro hub or a "service edge" at the periphery of the core network.

In contrast to the access network, the core network usually provides transport of large aggregate flows over long distances and handles the selective routing of each customer's voice and data traffic to other locations served by the network. The access network generally comprises a series of switches, aggregators, multiplexers, demultiplexers, routers, hubs, and the like, which provide connectivity between the customer's equipment and the core network.

FIG. 1 illustrates an example of a prior art access network 100 in which a customer (i.e., an end-user of telecommunications services, not shown), located in one or more office buildings 110, 120, or 130, may connect to a service edge 165 and onto the various service networks, designated by service networks 170, 180 and 190. In the example access network diagram 100, the access network may comprise metro node 150, a Local Exchange Carrier (LEC) 140, and a metro/long-distance (LD) hub 160.

Typically, the customer's equipment may comprise many devices, such as routers, hubs, workstations, Ethernet switches, or the like. In the example shown, these devices may comprise an Ethernet device, frame relay (FR) or asynchronous transfer mode (ATM) devices, etc. A customer's devices are often collectively referred to as customer premise equipment (CPE). For example, in a typical environment such as building 110, the CPE may be an Ethernet device 111. Ethernet device 111 may be connected to add/drop multiplexer (ADM) 112, wherein ADM 112 may be part of the service provider network. ADM 112 serves to aggregate lower bandwidth services from one or more customers for transmission over a larger bandwidth link, or pipe, illustrated by the TDM based SONET OC-N connection 155. For purposes of efficiency, the service provider often designs its network so that smaller volumes of communications traffic flow into tributaries to be combined with other similar sized flows to form larger aggregate flows. Progressively larger aggregate flows leverage economies of scale and justify extremely high-bandwidth communications in the core network (not shown). These high-bandwidth communications are much easier and more cost effective to maintain and control than a large number of smaller bandwidth resources would be individually, particularly over very long distances.

An access network 100 is typically viewed as a conduit to deliver raw traffic to a service edge. For this simple purpose, TDM links are traditionally used to fulfill the needs of all types of traffic. TDM communications links, such as the common T1 or DS3 access links, have been commonplace for many years and are a very familiar legacy of traditional telephone technology. As business data communications needs have emerged, especially over the last two decades, a TDM link has been the principal way of delivering customer traffic to the service provider's "doorstep," the service edge. By design, the TDM communications link is well-suited for handling inherently constant bit rate communications and more recently has been adapted for carrying packet-oriented traffic such as Ethernet traffic. With some adaptations, such as inverse multiplexing, channels of a TDM link may even be used for carrying ATM or frame relay traffic. When a TDM link is used in this manner, it is essentially a passive communications conduit between exactly one customer or site and the service provider edge. Each customer usually arranges their own access through a dedicated T1 line to the service edge. The dedicated T1 line is often reserved for the given customer and entirely paid for by that customer, whether directly or indirectly.

In the example access network diagram 100, a customer in building 110 needs to connect Ethernet (111) and frame relay (114) services onto the access network. In a traditional TDM based access network, a higher bandwidth OC-3 or OC-12 link (155) is connected to an ADM 112 in the building. The ADM serves to de-multiplex the larger bandwidth OC-N link into multiple DS3 links, one of which connects ADM 112 to Ethernet device 111. A customer needing frame relay service 114 may connect to the network through a T1 line provided by an M13 multiplexer 113, which converts the DS3 link from the ADM into multiple T1 links.

Customers in buildings 120 and 130 may access the network via DS3 or T1 lines that have been leased from a telephone company, as represented by local exchange carrier (LEC) 140. The LEC then may aggregate the multiple TDM based links from multiple customers into a higher bandwidth link, perhaps an OC-N based link, before passing it onto the metro node 150. Otherwise, LEC 140 may simply couple customer sites to metro nodes via individual T1/DS3 connections. The metro node 150 then further aggregates and grooms the smaller communications traffic flow into tributaries to form larger aggregate flows, using, for example, ADM's 151, digital cross connects 152 and a fiber distribution frame 153. The larger aggregate flows 159 are passed on to a metro/LD hub 160, where the traffic is processed for distribution to other service networks, e.g., service networks 170, 180 and 190, and to the core network (not shown). The metro/LD hub 160 may also use a collection of ADMs 164, digital cross connects 162, a fiber distribution frame 163, and one or more switches or routers 161.

Provisioning to establish new communications or make changes to existing communications in an access network in accordance with the prior art is often burdensome and time-consuming. Providing new services or additional bandwidth to a customer typically involves submitting service order tickets to an incumbent local exchange carrier and/or performing manual patching of cables in the service providers' sites and often at a customer site as well. One of the major inefficiencies of an access network lies in provisioning a customer's access link(s) for service. Provisioning often involves a great deal of manual cable patching at various sites, along with configuring a variety of equipment, including the various ADMs, crossconnects, switches, etc. In a typical scenario, it is not unusual for a path between a customer site and a service edge to comprise more than 20 "touchpoints," that is, places where a cable must be manually plugged in or equipment must be manually configured in some way.

Furthermore, traditional approaches have required meticulous handling of separate flows which involves manpower and extra multiplexing and switching equipment. For example, it is common to provide ATM services to a customer by using four DS-0 TDM circuits in an inverse multiplexing arrangement. This means that, in addition to transferring ATM traffic to TDM traffic using special equipment at the customer end, the separate DS0 circuits must each be managed, provisioned and groomed in the service provider's network to reach their proper common destination. These complicated manipulations are a consequence of fitting ATM onto the common TDM transport signals.

Additional equipment and communications links are also necessary to provide operations personnel visibility into an access device which is typically located at a customer premise. In an "off-network" situation, it is frequently necessary to have a separate T1 or DS3 communications link (or at least a separate telephone line) from the service provider to the access device or other equipment located in the customer's building. A multiplexer and/or router would receive the communications link and isolate the channel used for maintenance and control and route that channel to an access device. This type of configuration creates an out-of-band maintenance and control channel that requires additional equipment and physical set-up. Additionally, because a separate T1 communications link is utilized for relatively simple low-bandwidth maintenance and control communications, the out-of-band maintenance control channel is wasteful and expensive.

Thus, a primary concern for network providers is simplifying and reducing the burden of monitoring, control and provisioning of network elements in an access telecommunications network.

SUMMARY OF THE INVENTION

These and other problems are generally solved or circumvented, and technical advantages are generally achieved, by a preferred embodiment of the present invention which establishes an in-band logical communications flow between a control system and an access device, wherein the in-band communications flow is adapted to carry control, maintenance, and provisioning commands and information.

In accordance with one embodiment of the present invention, an access device having a first port, a second port, and a processing unit is provided. The first port is configured to communicate to a network node via a first communications link, and the second port is configured to communicate with a demarcation device. The processing unit is configured to respond to commands received in a maintenance and control flow with the first communications link. Other flows within the first communications link are configured to carry customer data.

In accordance with another embodiment of the present invention, a method of providing management information of an access device is provided. The method comprises the steps of establishing a first communications link on a first port and establishing a second communications link on a second port. The first communications link is communicatively coupled to a telecommunications network and has a plurality of flows. One of the flows is configured to be an in-band management and control flow, and at least one of the other flows is configured to carry customer data. The second communications link is communicatively coupled to customer premise equipment.

In accordance with yet another embodiment of the present invention, a control system for a telecommunications network is provided. The control system comprises a first port and a processing unit. The first port is configured for communicatively coupling to a telecommunications network. The processing unit is configured for establishing a maintenance and control flow from the control system to an access device. The maintenance and control flow may be used for provisioning, monitoring performance, troubleshooting, and the like.

In accordance with yet another embodiment of the present invention, a method and apparatus for provisioning a service from an access device to the service edge from a remote location is provided. The method includes the steps of receiving a service provisioning request and retrieving a network topology. Provisioning instructions are generated and issued to the network elements from the access device to the service edge. In a preferred embodiment, the provisioning commands are issued to the access device via an in-band maintenance and control flow. The provisioning method may be performed in a distributed manner or a centralized manner.

An advantage of a preferred embodiment of the present invention is that a service may be provisioned in a fully automated fashion from a demarcation device all the way to the service edge using an in-band maintenance and control channel.

A further advantage of a preferred embodiment of the present invention is that management and maintenance information may be exchanged in a fully automated fashion between a control system and remote network elements using an in-band maintenance and control channel.

Additional features and advantages of the invention will be described hereinafter. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely, providing management, control, test, and provisioning functionality to access points in an access network. The invention may also be applied, however, to other functions and other network nodes, such as T1 lines, satellite services, application services and the like. Furthermore, while specific access networks are illustrated and discussed herein, it is noted that network configurations may vary to include additional elements, such as routers, gateways, bridges, ATM switches, frame relay switches, firewalls, switches, multiplexers, demultiplexers, and the like. The illustrated embodiments are provided for illustrative purposes only and are provided only to aid in the explanation and understanding of the concepts of the present invention. Accordingly, aspects of the present invention are equally applicable to many types and configurations of networks and communications protocols.

It is further noted that, unless indicated otherwise, all functions described herein may be performed in either hardware or software, or some combination thereof. In a preferred embodiment, however, the functions are performed by a processor such as a computer, server, or an electronic data processor in accordance with code such as computer program code, software, and/or integrated circuits that are coded to perform such functions, unless indicated otherwise.

Figure 1:
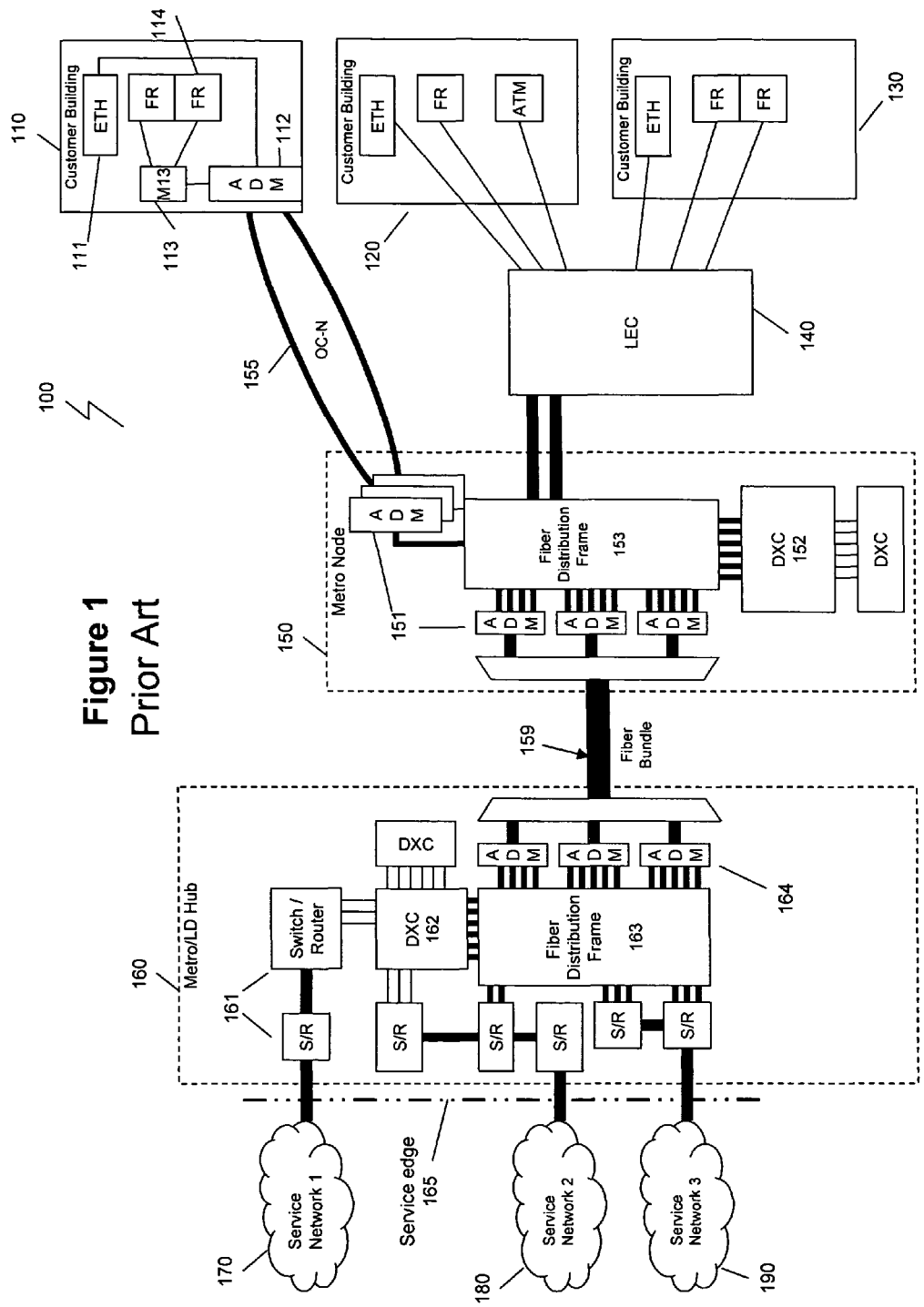
FIG. 1 illustrates a simplified diagram of a prior art telecommunications access network.
Figure 2:
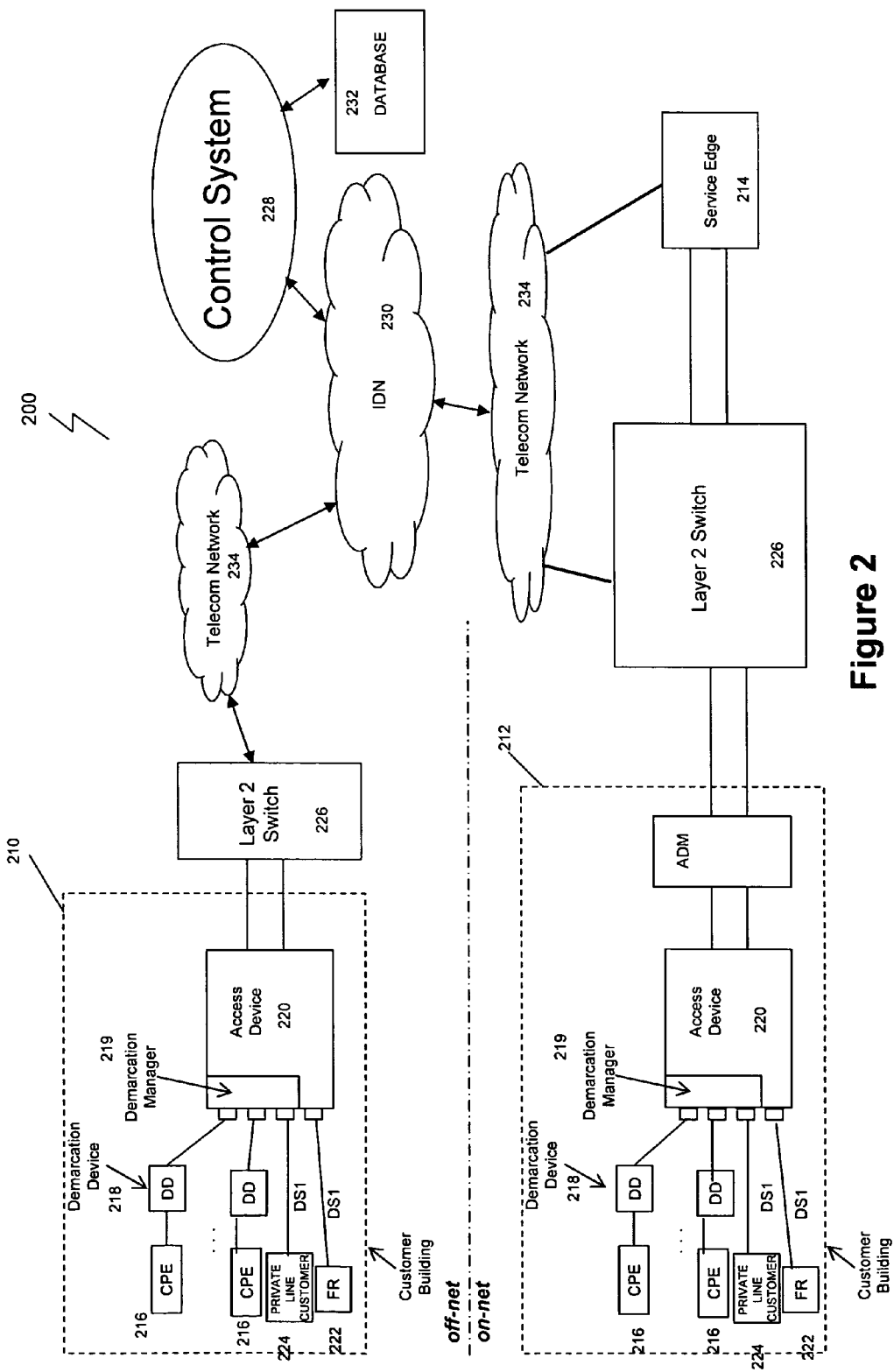
FIG. 2 illustrates an access network diagram embodying features of one embodiment of the present invention.

Referring now to FIG. 2, reference numeral 200 designates an access network diagram embodying features of one embodiment of the present invention. It should be noted that the network diagram 200 has been simplified to better illustrate features of the present invention. Well-known elements have not been shown, but are nonetheless part of a communications network embodying features of the present invention. For example, a network embodying the present invention may include amplifiers, power supplies, switches, bridges, ATM switches, frame relay switches, gateways, routers, firewalls, core network elements, and the like.

The access network diagram 200 illustrates one embodiment of an access network in which a customer (i.e., an end-user of telecommunications services) located in office buildings 210 and 212, may connect to a service edge 214. It should be noted that the illustrated embodiment is discussed in terms of an office building for illustrative purposes only. Office buildings 210 and 212 represent customers requiring communication/data services via the access network 200. It has been found that an office building typically contains a large concentration of customers wherein embodiments of the present invention may be particularly useful. In other embodiments, office buildings 210 and 212 may be a single-dwelling house, an apartment complex, a multi-tenant office building, a single-tenant office building, a corporate campus, or the like. While the invention is not so limited, for purpose of illustration, the office buildings 210 and 212 are assumed to be multi-tenant office buildings in the disclosed embodiments.

Furthermore, the service edge 214 is illustrated as a single network element for illustrative purposes only, and may include two or more network elements. Likewise, the communication path between the customer and the service edge 214 is illustrated as a simple two-hop connection for illustrative purposes only. The communication path between the customer and the service edge 214 may contain additional or fewer hops, and may include different paths for the inbound and outbound traffic. Although not shown in FIG. 2, service edge 214 represents the periphery of a service provider's core network, which may be quite extensive and may interconnect a vast number of customer buildings 210, 212 through many other service edges 214.

Typically, the customer's devices comprise a router coupled to devices such as other routers, hubs, workstations, personal computers, or the like. The customer's devices are collectively referred to as customer premise equipment (CPE) 216 as illustrated in FIG. 2. For example, in a typical environment the CPE 216 may be an Ethernet router communicatively coupled to a customer LAN (not shown). Individual user devices, e.g., workstations, personal computers, and the like, are coupled to the LAN to provide connectivity to a group of users.

The CPE 216 is communicatively coupled to a demarcation device (DD) 218. The demarcation device 218 represents the end of the access network 200 and the point at which the customer connects to the access network 200. In a typical embodiment, it is expected that each floor in office buildings 210 and 212, or each customer or other means of division, may have a separate demarcation device 218. Depending upon the height of the building and the lengths of the wire runs, additional components, such as repeaters and amplifiers, may be required.

The demarcation devices 218 are communicatively coupled to an access device 220, which provides switching and access services to the CPE 216. A demarcation device manager 219, preferably located within access device 220, controls communication between one or more demarcation devices 218 and the access device 220. Demarcation device manager 219 may be a separate device within or external to access device 220, or demarcation device manager 219 may comprise circuitry and/or software integral to the access device. It is expected that typical connections between the demarcation devices 218 and the access device 220 include Ethernet via 100BT, 100FX, GbE, VDSL, or other applicable communication protocols.

In other embodiments, the access device 220 may be capable of coupling to other types of devices. For example, a customer may require connectivity to a frame relay (FR), such as frame relay 222, via a DS1 connection. Other customers, such as private line customer 224, may also require a DS1 connection. Other types of connections may be used as required to support specific customer's needs.

Preferably, the access device 220 also provides aggregation and translation services. As noted above, customers within a building may require different types of access, or a single customer may require different types of access for different services. In these situations, it is preferred to utilize an access device that preferably provides an interface to one or more pieces of CPE, which may be using one or more communications protocols, and aggregates the traffic into a form suitable for transmission in the access and core networks.

On the network side, the access device 220 may communicatively couple to the network via a DS3 communications link. The access device 220 preferably provides aggregation services such that multiple communications links between the access device and the CPE may be aggregated and condensed into fewer communications links between the access device and the access network.

One such access device 220 is disclosed in U.S. patent application Ser. No. 10/858,503 entitled "Method and Apparatus for Processing Labeled Flows in a Communications Access Network", which is incorporated herein by reference.

The access device 220 is preferably communicatively coupled to the access network. However, additional network elements may be required between the access device 220 and the access network. For example, in an "on-network" scenario, i.e., the access network is owned by the service provider, an add/drop multiplexer (ADM) may be required. Frequently, service is provided to a building via an OC-n link, such as an OC-12 or OC-48 optical link, but the access device, such as the access device referred to above, is equipped with a smaller link, such as DS3. Thus, the ADM provides a mechanism for the DS3 traffic from the access device to be separated from and interjected onto the larger OC-n link. It should be noted that the "off-network" scenario frequently does not require additional equipment at the customer's site. A leased DS3 link may be coupled to the access device.

One or more hubs or switches, represented by switch 226 in FIG. 2, provides connectivity between the office buildings 210, 212 and the service edge 214. Preferably, the switch 226 provides layer 2 switching services such that carrier-tagged communications employing VLAN tags as carrier tags are supported as described herein. Embodiments of the present invention, however, may utilize techniques other than VLAN tagging as discussed below.

One such layer 2 switch is disclosed in U.S. patent application Ser. No. 10/858,517 entitled "System And Method For Providing A Multiple-Protocol Crossconnect", which is incorporated herein by reference.

A control system 228 and an internal data network (IDN) 230 provide management and control connectivity. It should be noted that the IDN 230 may be physically implemented as a collection of interconnected network nodes, such as switches, bridges, ATM switches, frame relay switches, multiplexers, de-multiplexers, routers, and the like. The IDN 230 is communicatively coupled to the telecommunications network 234. It should be noted that the IDN 230 may be part of or overlapping the telecommunications network 234, but 230 and 234 are shown here as two distinct networks for illustrative purposes. The configuration and implementation of the IDN 230 is not particularly important to the present invention, except as otherwise noted herein, and therefore, is simplified for illustrative purposes only.

The control system 228 is configured to provide operations personnel (not shown) a method to access, monitor, configure, and provision network elements. Notably, it is preferred that the control system 228 is configured to provide operations personnel the ability to query the status of remote devices as will be explained in greater detail below. The visibility of remote network elements provided by the control system 228 may vary. In some situations, it may be desirable to only provide status information of the IDN 230. More likely, however, it will be desirable to provide operations personnel access to status information regarding equipment located on customer premises, and sometimes, status of the customer equipment. Embodiments of the present invention may be used in either scenario.

The control system 228 is also communicatively coupled to a control database 232 to provide storage for and access to network topology and status information. The control database 232 may be a separate, stand-alone database system or integrated into the control system 228. The control database 232 may comprise, for example, a semiconductor memory, a hard drive, or another storage system, and may be located in a single location or distributed between a number of remote locations.

With regard to the above description, it should be noted that the specific formats and abilities of the access device, access networks, and core networks are not central to the present invention. The present invention may support the service provider's ability to communicate with the access device, or other network elements, from a remote location, allowing a service provider to rapidly deploy services and equipment in a manner not available in prior art systems. Preferably, the service provider could configure a service and/or monitor system performance and customer usage in an automated, efficient and cost-effective manner and reducing or eliminating manual steps.

In accordance with a preferred embodiment of the present invention, access network elements such as access device 220 and layer 2 switch 226 handle customer traffic to/from CPE 216 in the form of carrier-tagged flows. These network elements may process and transport the customer traffic by interpreting and manipulating carrier tags associated with data frames carrying the traffic in a packet switched access network. The present invention is not limited to situations wherein the customer traffic is handled in this manner.

An example of a technique suitable for implementing a carrier-tagged flow is a logical networking tagged flow, such as virtual local-area network (VLAN) communications or the like. A technique for achieving VLAN logical subnetworking is described in IEEE Standard 802.1Q. Briefly, a VLAN provides for designating and acting upon data packets in a manner that makes multiple LAN communication flows carried over a commonly shared communication path appear to be partitioned from one another as if traveling over separate, dedicated LAN connections. In accordance with an exemplary embodiment of the present teachings, a VLAN tagging approach may also be used for carrier-tagging of flows.

In accordance with the present teachings, carrier VLAN tags having significance for routing and processing in the access network may be used to encapsulate and tag customer flows. As they are encapsulated and/or tagged, customer flows may or may not already contain additional imbedded VLAN tags having significance within the customer's virtual network in accordance with typical 802.1Q usage. In accordance with the present teachings, the VLAN tagging approach may be reused for carrier-tagging purposes and may be locally significant on any port, with tag values possibly being replaced on a hop-by-hop basis.

In accordance with a preferred embodiment of the present invention, a specific VLAN tag value may be reserved for performing in-band management communications. For example, a VLAN tag value of 4095 (all twelve bits of the VLAN identifier set to logical '1') may signify in-band management communications as distinct from customer traffic, which will bear other VLAN tag values. Any other value, or a set or range of values, may arbitrarily be set aside for this purpose without departing from the spirit and scope of the present invention. Some bits or fields within a VLAN tag or other carrier tag structure may also be used. Note that, where carrier tagged communications are used, the outermost VLAN tag value is exclusively under the control of the service provider and that customer flows are prevented from interfering with or mimicking management communications.

Figure 3:
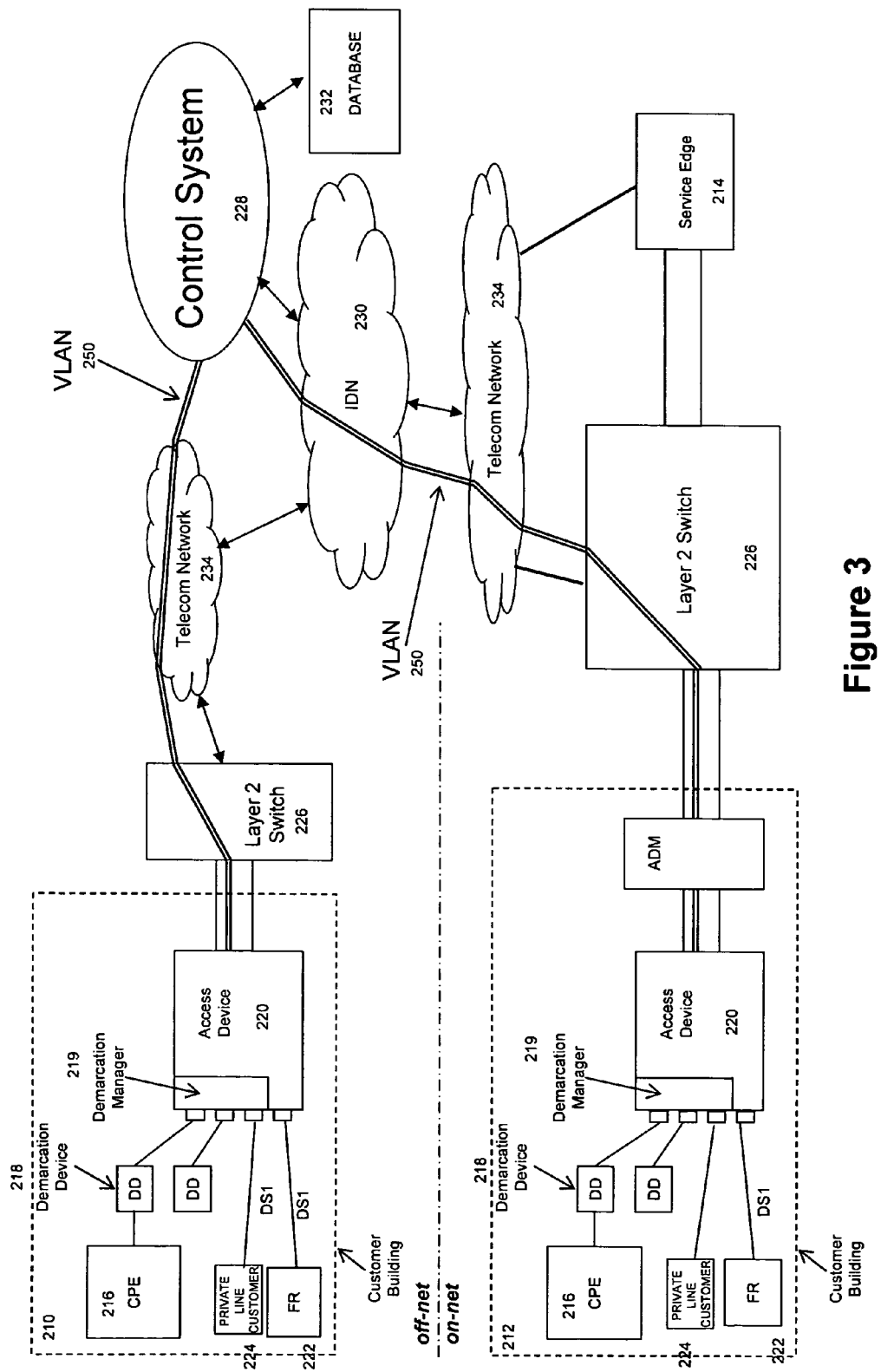
FIG. 3 illustrates an access network diagram utilizing an in-band communications flow for providing management and control capabilities for network elements in accordance with one embodiment of the present invention.

Referring now to FIG. 3, one method of providing management and control capabilities for remote devices at the customer site in accordance with one embodiment of the present invention is illustrated. Specifically, FIG. 3 illustrates the establishment of a logical communications link between the control system 228 and the access device 220. In a preferred embodiment, the logical communications link is a virtual local area network (VLAN).

As illustrated in FIG. 3, a VLAN 250 may be established in either an "on-network" or an "off-network" environment. In either case, the VLAN header may be used to provide layer 2 routing instructions to the IDN 230 and telecommunications network 234. It should be noted, however, that even though a VLAN is discussed herein as a preferred embodiment, other methods may be used, such as a pseudowire concept as recently proposed by the Internet Engineering Task Force. Any method that provides a logically separable, in-band communications flow between the access device 220 and the control system 228 is sufficient.

In this situation, a layer 2 VLAN virtual connection 250 is established between the control system 228 and the access device 220. While the VLAN gives the appearance that a direct link has been established between the control system 228 and the access device 220, the VLAN 250 is established through the IDN 230, telecommunications network 234, and any other intervening switches, such as layer 2 switch 226. This type of communications channel provides an in-band communications flow for maintenance and control functions.

In contrast, prior art methods utilize a dedicated communications link wherein, for example, a separate T1 line or a telephone connection is communicatively coupled to the access device to provide a communications link for control and maintenance functions. A separate T1 is costly and wasteful. The method and system of the present invention, however, provides an in-band communications flow that is available at the time the communications link to the access network is established. Furthermore, little or no additional equipment need be installed at the customer premises simply to provide control and maintenance functionality. As a result, services may be provisioned faster without the added expenses and delays normally associated with deploying equipment and personnel to a remote site.

In the preferred embodiment, a VLAN header that encapsulates the control and maintenance messages includes a VLAN identifier and an access device identifier. The format of the VLAN header may be formatted in accordance with a standard (e.g., SNMP) or in accordance with a vendor proprietary format. The VLAN identifier is used to specify the control and maintenance VLAN and is preferably VLAN identifier 4095, which is typically reserved for system usage. By using VLAN identifier 4095, the maintenance and control VLAN does not utilize or make unavailable one of the other VLAN identifiers.

The access device identifier uniquely identifies the access device on each control and maintenance VLAN. By assigning each access device a unique access device identifier, a single VLAN may be used to monitor multiple access devices. An access identifier field having 'N' bits allows a single VLAN to control '2 to the Nth power' number of access devices. Additional VLANs may be used to control additional access devices if needed or desired to group access devices onto separate VLANs.

Furthermore, the VLAN header preferably contains information identifying specific ports on the access devices, such as ports communicatively coupled to CPE 216. One such method allows a port to be identified by a combination of a shelf identifier, a card identifier, and a port identifier. Typically, network elements, such as the access device, are manufactured in racks. Each rack has one or more shelves, and each shelf is capable of holding one or more cards. Cards also frequently have multiple ports. The combination of the shelf identifier, card identifier and port identifier provides one way for the control system to uniquely identify a specific port.

It may also be desirable to obtain information, such as performance and usage data, regarding a specific flow within a port. For example, a customer may have an Ethernet connection via a VDSL link between the access device and the CPE. Within the single Ethernet connection, the customer may have multiple flows, such as one VLAN networking customer support organizations nationwide, another VLAN networking research and development organizations together, and yet another VLAN networking development organizations together. In these situations, it may be desired to gather information or configure each particular flow. Thus, it is desirable that the VLAN header carrying control information to also contain a flow identifier which specifies a VLAN identifier of a specific traffic flow to be monitored or otherwise acted upon.

Figure 4:
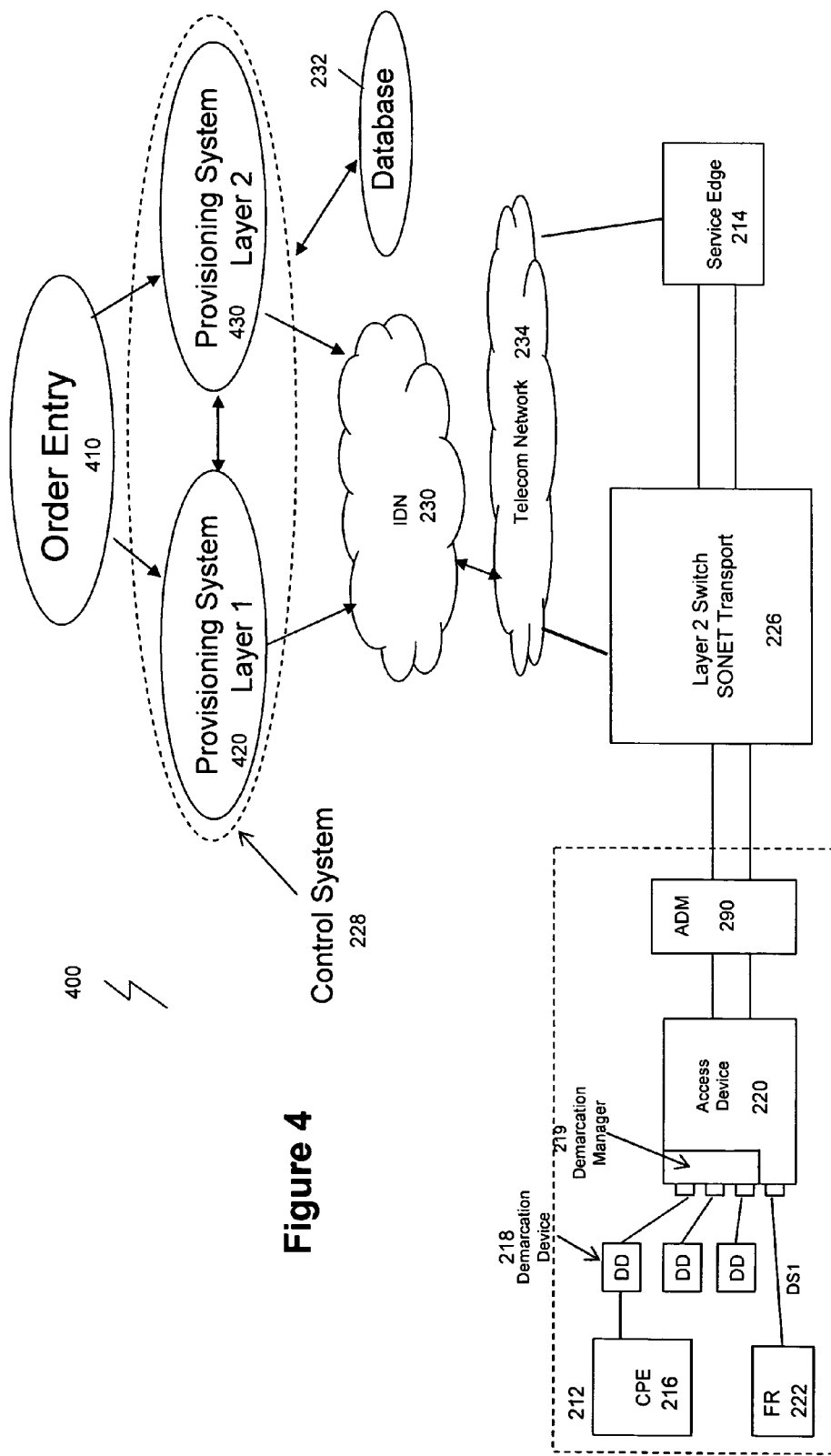
FIG. 4 illustrates an access network diagram utilizing a control system for providing provisioning capabilities for network elements in accordance with one embodiment of the present invention.

Referring now to FIG. 4, an automated system 400 for provisioning network elements within the service provider's network and at the customer site in accordance with an exemplary embodiment of the present invention is illustrated. The provisioning system 400 is focused on the "on-network" portion of the service provider's network, which is substantially similar to the "on-network" scenario shown in FIG. 3. The principles discussed herein are equally applicable to the "off-network" portion shown in FIG. 3, and the "off-network" portion is omitted for simplicity. The term "on-network" as used herein refers to a situation wherein the core network service provider owns and operates the communications link reaching to the customer premise. The term "off-network" as used herein refers to a situation wherein the communications link is leased from a third party, such as a local exchange carrier.

Control system 228 of provisioning system 400 may be further subdivided into a layer 1 provisioning system 420 and a layer 2 provisioning system 430. Provisioning systems 420 and 430 are preferably software processes running within control system 228. In a preferred embodiment of the present invention, control system 228 is a computer system or server physically located within one of the service provider's data centers. In a preferred embodiment, communications between control system 228 and the network elements to be provisioned are provided via a VLAN based in-band communications flow 250, as shown in FIG. 3.

An order entry process 410 is used to communicate a customer's request for new services, for example, establishing a physical link from a CPE 216 to the service edge 214, a change in bandwidth of a provisioned flow within a link, adding of new flows, or other service upgrades. This order entry could be implemented using a variety of methods and systems. In a preferred embodiment, a customer could submit a work service order to the service provider, wherein the service provider directly enters the details of the work service order into the control system 228. In another preferred embodiment, a customer could be communicatively coupled to the control system 228, through a direct LAN or WAN connection, or via the Internet, for example, wherein the customer directly enters the service request into the control system 228. This service request entry can be initiated manually or verbally by a person, or automatically among customer premise devices and/or network components without requiring human intervention.

In yet another exemplary embodiment, a customer may have a system monitoring CPE resource usage either in real time or otherwise, wherein the customer system could issue a service request into control system 228. In this way, a customer could request bandwidth allocation or other service changes dynamically as resource demand fluctuated. This type of agile provisioning, giving a customer a high degree of control over resources, allows the service provider to offer "bandwidth-on-demand" services, wherein the amount of bandwidth made available to the customer could freely vary from moment to moment according to the customer's immediate needs. This allows for more granular, usage-based billing proportional to the customer's actual burden upon the resources of the network.

Figure 5:
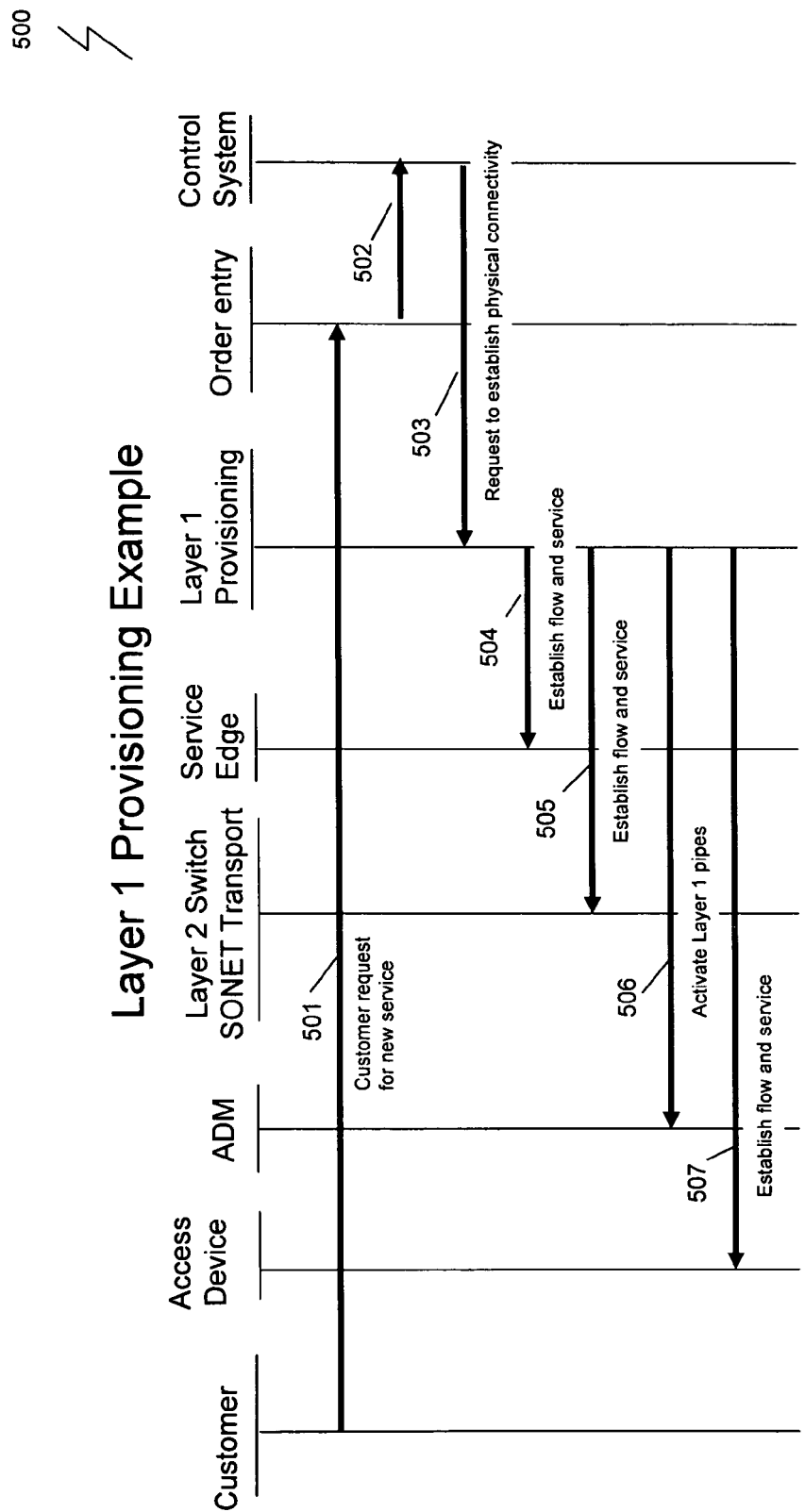
FIG. 5 illustrates an example of a series of steps carried out to accomplish layer 1 provisioning in accordance with one embodiment of the present invention.

A description of an exemplary automated provisioning process is described with reference to FIGS. 5 and 6. In FIG. 5, chart 500 illustrates an example of a series of steps carried out to accomplish layer 1 provisioning. A layer 1 provisioning process is necessary if a requested bandwidth or service is not currently available in the network because, for example, a physical pipe is not yet installed or there is insufficient bandwidth available within an existing pipe. In step 501 a customer issues a request for service, which is entered into the control system via step 502, possibly comprising one of the methods described above. The control system processes the request within layer 1 provisioning system 420, which may access network topology information contained within database 232. In this example, the layer 1 provisioning system 420 determines that a new physical connection needs to be established, and proceeds to generate the information necessary to establish the required connection(s). The process for establishing physical connectivity could range from a task as simple as issuing a work order instructing a technician to plug a cable into the appropriate demarcation device 218, to deploying an installation crew to bury a new fiber optic cable and connect it to the customer building.

A truck roll refers to one or more technicians physically traveling to an installation site to perform a manual provisioning step, for example, plugging a cable into a demarcation device, or logging in via an on-site terminal and manually inputting provisioning commands. Layer 1 provisioning refers to achieving conduction of optical or electrical signals to a site. This may involve installing (or leasing) optical or electrical cables or setting up radio links between customer and service provider. Where an optical fiber already exists, layer 1 provisioning may also refer to adding a new optical carrier or 'wavelength' to the set of optical signals carried in the fiber. This is done by adding an optical transmitter and receiver pair tuned to a specific wavelength. In the layer 1 provisioning process, truck rolls are often required because the necessary layer 1 resources, whether wires or fiber or transmitters/receivers, are not in place. For example, in step 507, if a physical connection does not exist between the access device and the ADM, a truck roll would be required to install a new connection. Likewise, steps 504, 505 and 506 may or may not require truck rolls, depending on the existing network topology at the time the new service is requested.

Part of the layer 1 provisioning process would be to perform one or more tests to ensure that the proper connections were made and are capable of providing the required service. For example, one or more loopback tests may be performed to check the integrity of the connection, and whether electrical and/or optical hardware is functioning properly. An optical signal strength test may be performed to check, among other things, whether the connectors are clean or if the fiber has been damaged. A time domain reflectometry (TDR) test may be performed to test the integrity of the electrical termination, or to isolate the location of a break in the electrical connection.

In a preferred embodiment of the present invention, layer 1 provisioning system 420 and a layer 2 provisioning system 430 communicate with each other and with database 232, as shown in FIG. 4. In this way, the layer 2 provisioning system 430 could begin operation concurrently with the layer 1 provisioning system 420, or it could begin after system 420 has indicated that the layer 1 provisioning steps have been completed. In a preferred embodiment, some of the layer 1 and layer 2 provisioning processes would be carried out concurrently.

It should be noted that the present invention may provide for layer 1 provisioning from a central location, which is highly desirable for a service provider and has not been achievable heretofore. Because the control system 420 has visibility into the network topology within the customer building, e.g., the access device 220 and the demarcation devices 218, the control system 228 is able to dynamically or statically retrieve the topology information and to automatically determine whether or not the layer 1 facilities are in place to provision the new service order. In contrast, prior art systems relied upon multiple databases that were manually updated, and often outdated and error prone.

Figure 6:
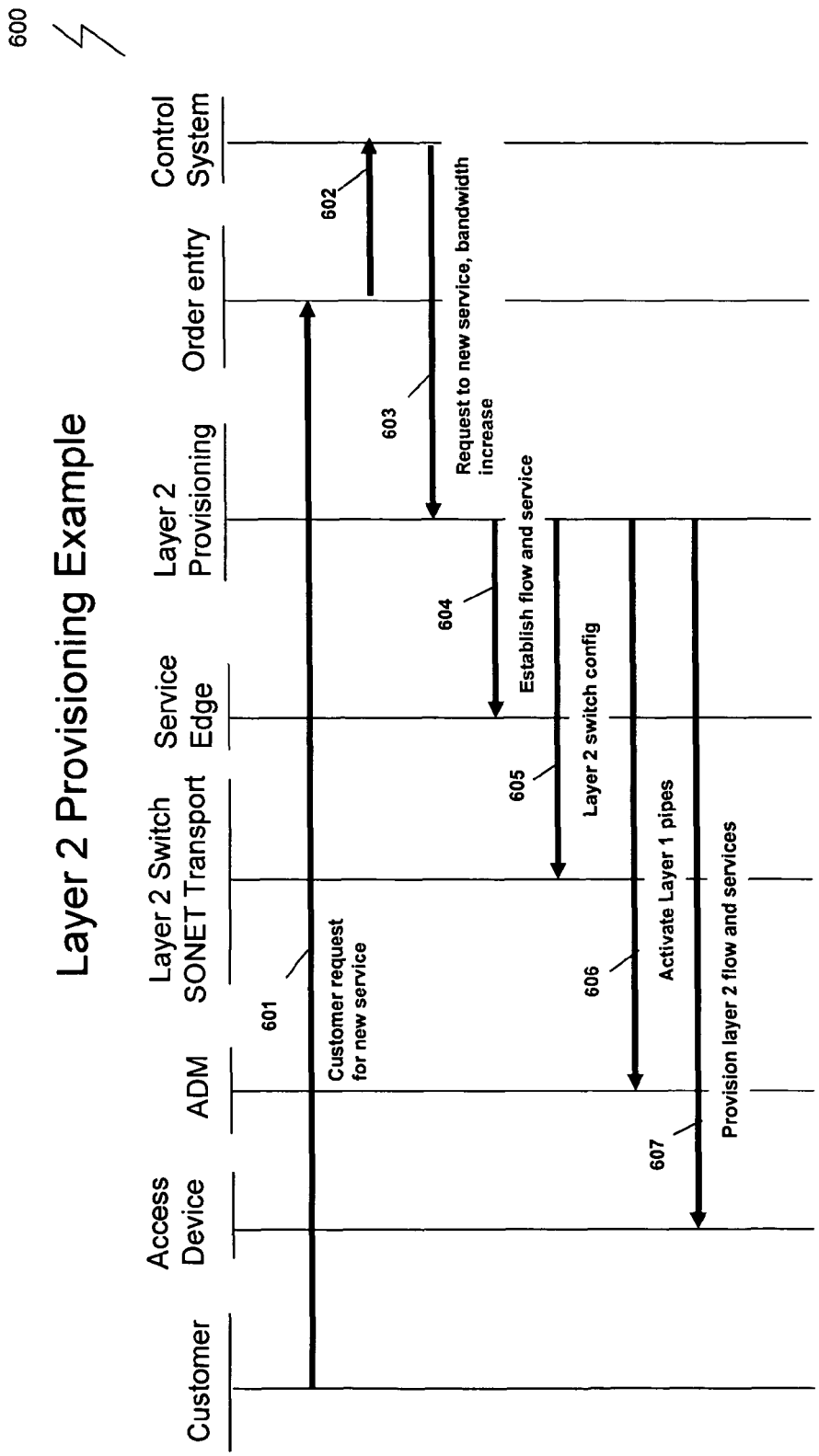
FIG. 6 illustrates an example of a series of steps carried out to accomplish layer 2 provisioning in accordance with one embodiment of the present invention.

FIG. 6 illustrates an example of a series of steps carried out to accomplish layer 2 provisioning. It should be noted that the provisioning steps discussed herein allow for a service to be provisioned in a manner that was not available in the prior art. In particular, the provisioning system described herein allows a service to be provisioned from the demarcation device 218/access device 220 all the way to the service edge 214 using an in-band maintenance and control channel. As described above, prior art provisioning systems utilized various systems and had limited visibility to equipment located on customer premises. Furthermore, the prior art provisioning systems did not provide an in-band management and control channel, but rather solely utilized out-of-band techniques that frequently required separate communication links and facilities along with the attendant costs and maintenance burdens.

The process begins with steps 601 and 602, as a customer request for service is entered into the control system. The control system processes the request within layer 2 provisioning system 430, which may access network topology information contained within database 232. The layer 2 provisioning system now determines all of the individual commands that need to be issued to the various network elements in order to configure the service. In step 604, the bandwidth that the customer is to be allocated is determined. The various network addresses and labels are assigned to the customer to determine the exact path of the communication flows out to the service edge. In step 605, for example, the switch 226 is provided with the layer two switch specific information. This could entail a definition of the specific cross connects within the switch to configure, and a definition of the label swapping protocols that are needed for the service. In step 606, the specific pipe(s), for example a DS-3, may need to be activated at ADM 290, or additional provisioning may need to be performed on the layer 1 pipe, such as that discussed above with reference to FIG. 5. In step 607, the layer two statistics are set up at the access device 220, along with layer two specific and flow service specific information.

Once the provisioning steps have been performed, the flow connection to the service edge can be established. In a preferred embodiment, layer 2 provisioning system 430 automatically provisions the various network elements via an in-band communications flow, preferably based on VLAN identifier 4095. The provisioning steps illustrated in FIGS. 5 and 6 are simplified for the purpose of illustration, and it is understood that there may be more or fewer steps that need to be performed to provision a particular flow.

Not shown in FIGS. 5 and 6 is the process for provisioning the demarcation device 218. It may be preferable to allow the access device 220 to distribute the provisioning commands to the individual demarcation devices through a LAN, where the addresses of the individual demarcation devices are locally significant to the access device, but have no global significance. This would allow the access device to receive provisioning information from the control system via the in-band communications flow, and distribute provisioning commands to the appropriate demarcation device. In this alternative embodiment, the access device 220 is configured to issue the appropriate commands to the demarcation devices 218. Provisioning results and errors may then be reported to the provisioning system for the appropriate action.

The above description of the service provisioning process can be thought of as carried out by a centralized provisioning system, where control system 410 receives a service request, determines the existing network topology by interacting with database 232, computes all of the required provisioning steps, then issues the commands to the appropriate network elements. All of the computations are performed in, and all commands are issued from a central location, for example a server residing in a data center. Conversely, the provisioning process may be carried out in a more distributed fashion, as illustrated by FIG. 7 taken in conjunction with the following discussion.

Figure 7:
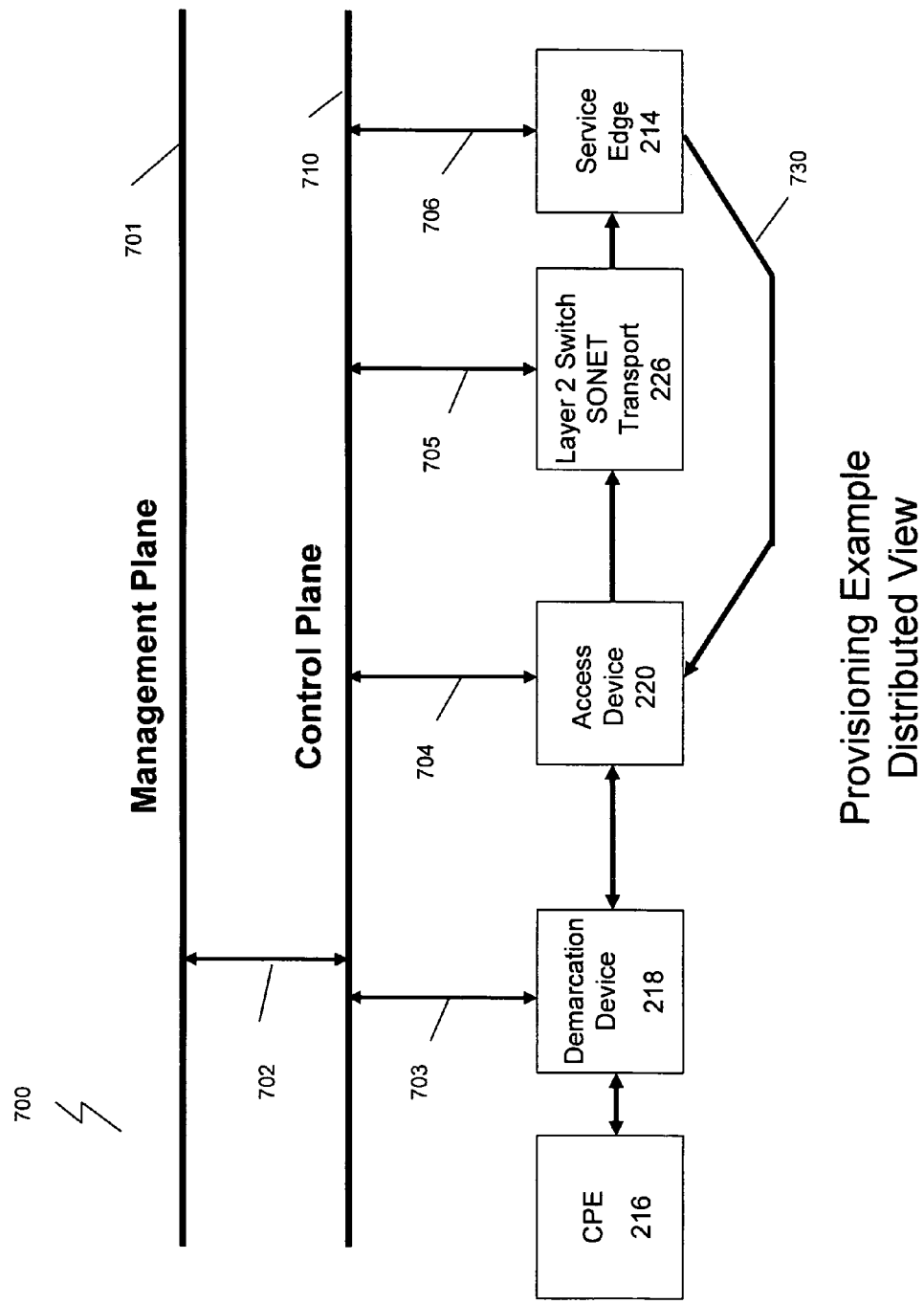
FIG. 7 illustrates a simplified access network diagram using a distributed provisioning system in accordance with one embodiment of the present invention.

In the distributed provisioning view of FIG. 7, one or more of the network elements, 218, 220, 226 and 214, are capable of determining the local connectivity topology of the network element. For example, access device 220 may have an internal system capable of determining which of its input/output ports are currently connected, what network element a specific port is connected to, and the bandwidth capacity and service capability of each individual connection. A centralized database containing complete up to date global network topology information is not required, as current network connectivity is determined, at least in part, by one or more individual network elements. The following example illustrates an exemplary service provisioning process in a distributed view.

Control system 228 can be thought of as having its functions separated into a management plane 701 and a control plane 710. A service request is input into the control system via order entry 410, using perhaps one or more of the methods previously described. The management plane 701 accepts the service request and communicates with control plane 710, instructing the control plane as to the services that need to be provisioned. The control plane then signals one or more of the network elements via an in-band communications flow, illustrated by paths 703, 704, 705 and 706, as to what service needs to be provisioned.

Access device 220, for example, looks at its local connectivity topology and responds back to the management plane 701 and/or control plane 710 with information regarding the connections that are available, the bandwidth available on a given connection, and the bandwidth that needs to be allocated in order to comply with the service request. The management and control planes 701 and 710 may receive information from multiple network elements. Based on the information received from the network element(s), the control plane 710 determines the flow path or paths. Note that there may be different paths capable of complying with the service request. Additionally, the inbound and outbound paths may differ, as illustrated by flow path 730. Once the control plane 710 has selected both the inbound and outbound flow paths, the control system sends provisioning commands via the in-band communications flow to the required network elements.

Another step in the provisioning task is a complete link test, checking every connection and network element from the CPE 216 to the service edge 214 involved in complying with the customer order. Preferably, this installation test is fully automated and capable of retrieving alarms, performance and configuration data from all affected network elements. All configuration data should be compared with the customer service order to ensure the service has been properly configured. The alarm and performance data should be checked to verify that the network path has been properly established and that the only existing alarm, if any, is at the customer demarcation point. If any other alarms or failures are detected, the data resulting from the installation test could be used in isolating the trouble spot.

In a preferred embodiment, the installation test is a program running within the control system. Small programs running as a process on a computerized control system are often referred to as scripts. Illustrated in FIGS. 8*a* thru 8*e*, collectively referred to as FIG. 8, is a flow chart 800 describing the operation of an exemplary installation test script. In a preferred embodiment, the access device 220 and the demarcation device 218 may communicate via Ethernet, and in addition, the demarcation device 218 and the CPE 216 may also communicate via Ethernet. Other communication links, for example, between the access device and the switching device, may communicate via Ethernet, TDM, or other suitable communication protocols.

Figure 8A:
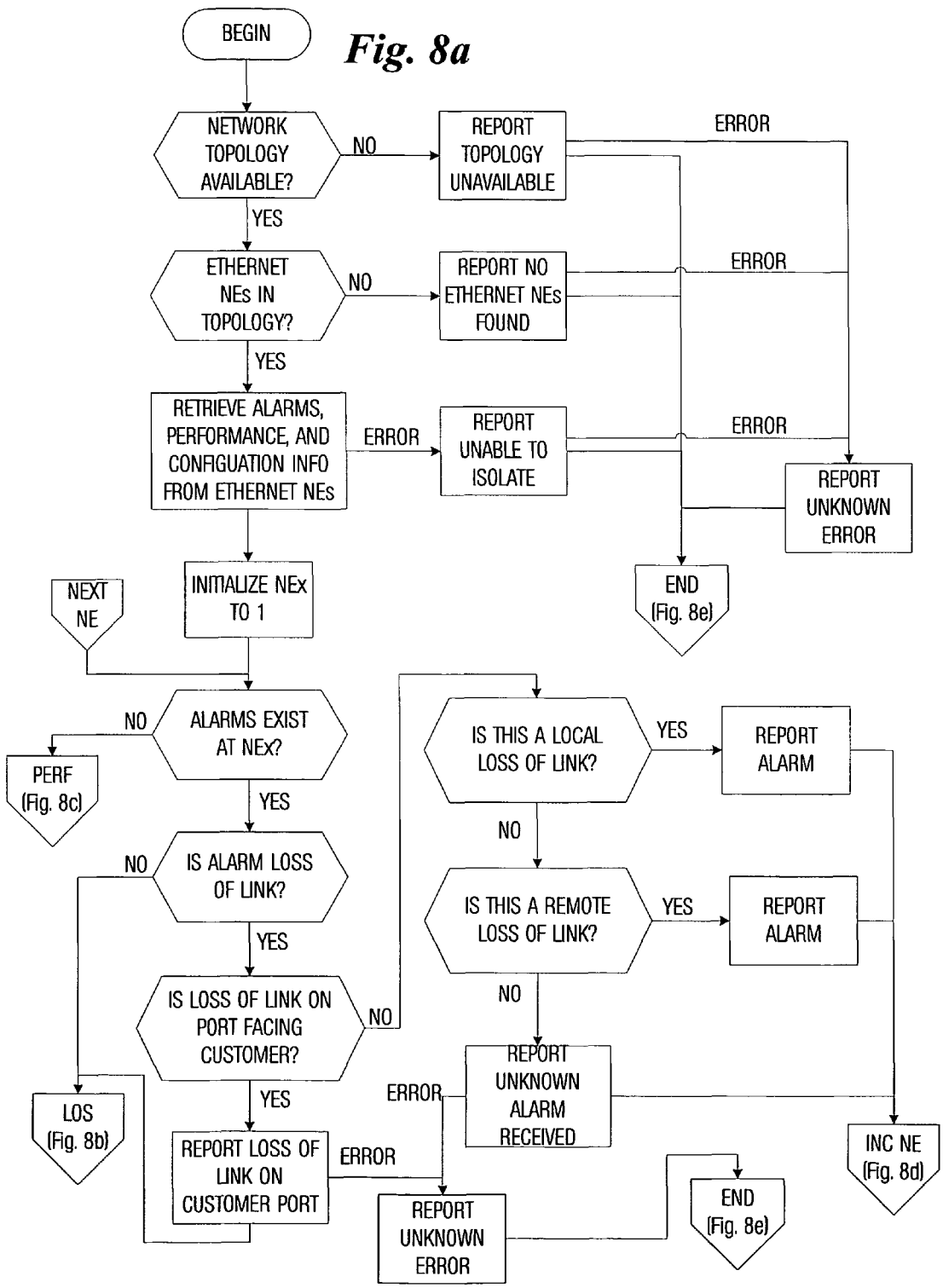
FIGS. 8a-8e illustrate steps that may be performed by a control system to test the installation of a service in accordance with one embodiment of the present invention.

Referring to FIG. 8a, the test begins by examining the network topology, determining if any Ethernet enabled devices exist in the topology, and then retrieving alarms, performance and configuration data from all Ethernet network elements. Next, the script proceeds to check the operation of each network element (NE) in sequence, starting by setting the variable "NEx" equal to one, and incrementing the variable NEx after each network element has been tested. The script first checks to see if any alarms exist on the device currently being tested, at a step "alarms exist at NEx?" If no errors exist, the script proceeds on to check for performance statistics and errors, illustrated in FIG. 8c. If an alarm does exist, the script proceeds sequentially down a list of possible errors, and for each error type detected, attempts to further narrow down the root cause of the error. If the cause of the error cannot be identified, a report is issued with a message "unknown alarm received."

Figure 8B:
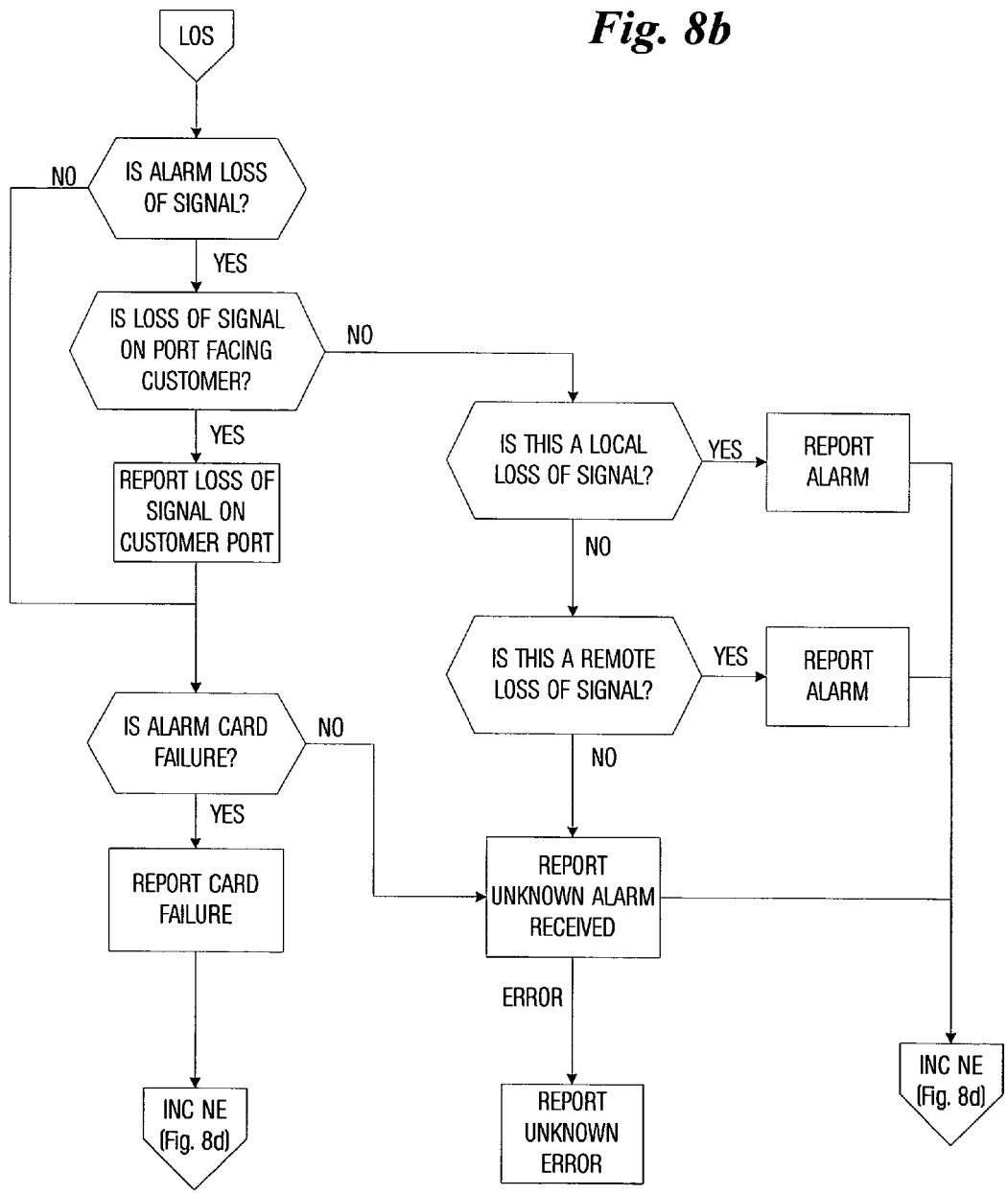
Figure 8C:
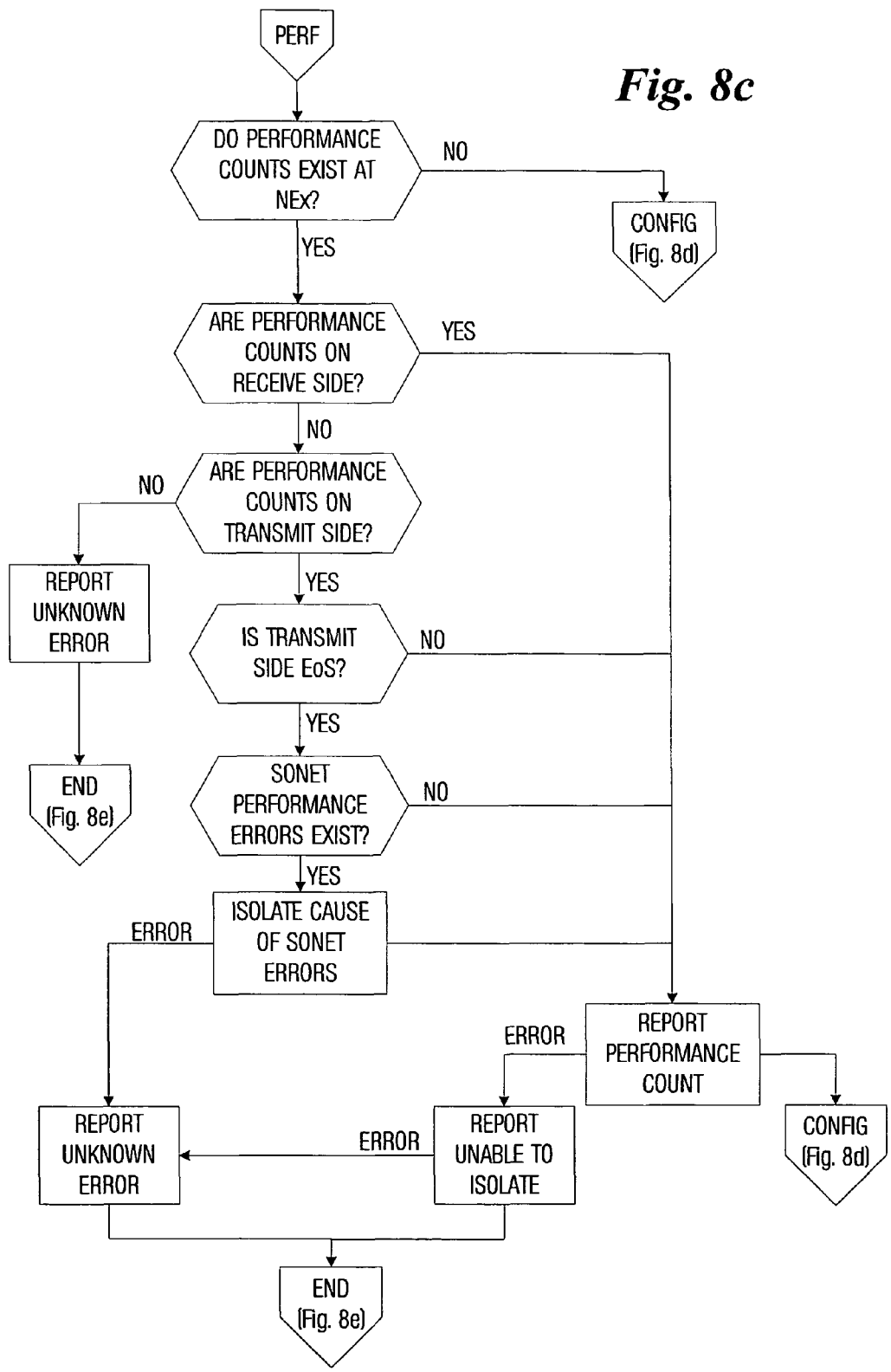

A "loss of link" (LOL) alarm generally indicates a problem with an Ethernet device. If a LOL is detected, the script checks to see if the LOL is on the port facing the customer, and if not, the script attempts to determine if the LOL resulted form a local or remote device. A "loss of signal" (LOS) alarm generally indicates a problem with a TDM device, which may indicate, for example, a pulled or cut cable, or other problems. If a LOS is detected, as illustrated in FIG. 8b, the script checks to see if the LOS is on the port facing the customer, and if not, it attempts to determine if the LOS resulted from a local or remote device. An "alarm card failure" indicates a problem with one of the circuit cards in the NE, and a report is issued which may initiate the process of directing a technician to perform maintenance on the affected NE. If the detected alarm does not fall into one of the above described alarm categories, an "unknown error" is reported.

If no alarms are reported by a given NE, the script enters a "performance count" routine (FIG. 8c), checking for performance error counts on the receive side and the transmit side. If no performance error counts exist, the script jumps to the configuration routine, illustrated in FIG. 8d. If performance error counts exist on the transmit side, the script checks if the transmit side is Ethernet over SONET (EoS), and if yes, do SONET errors exist, and if yes, isolate the cause of the SONET errors. Any performance errors will result in a jump to "END," terminating operation of the script (see FIG. 8e). Otherwise, performance error counts are reported, and the "config" routine is initiated.

Figure 8D:
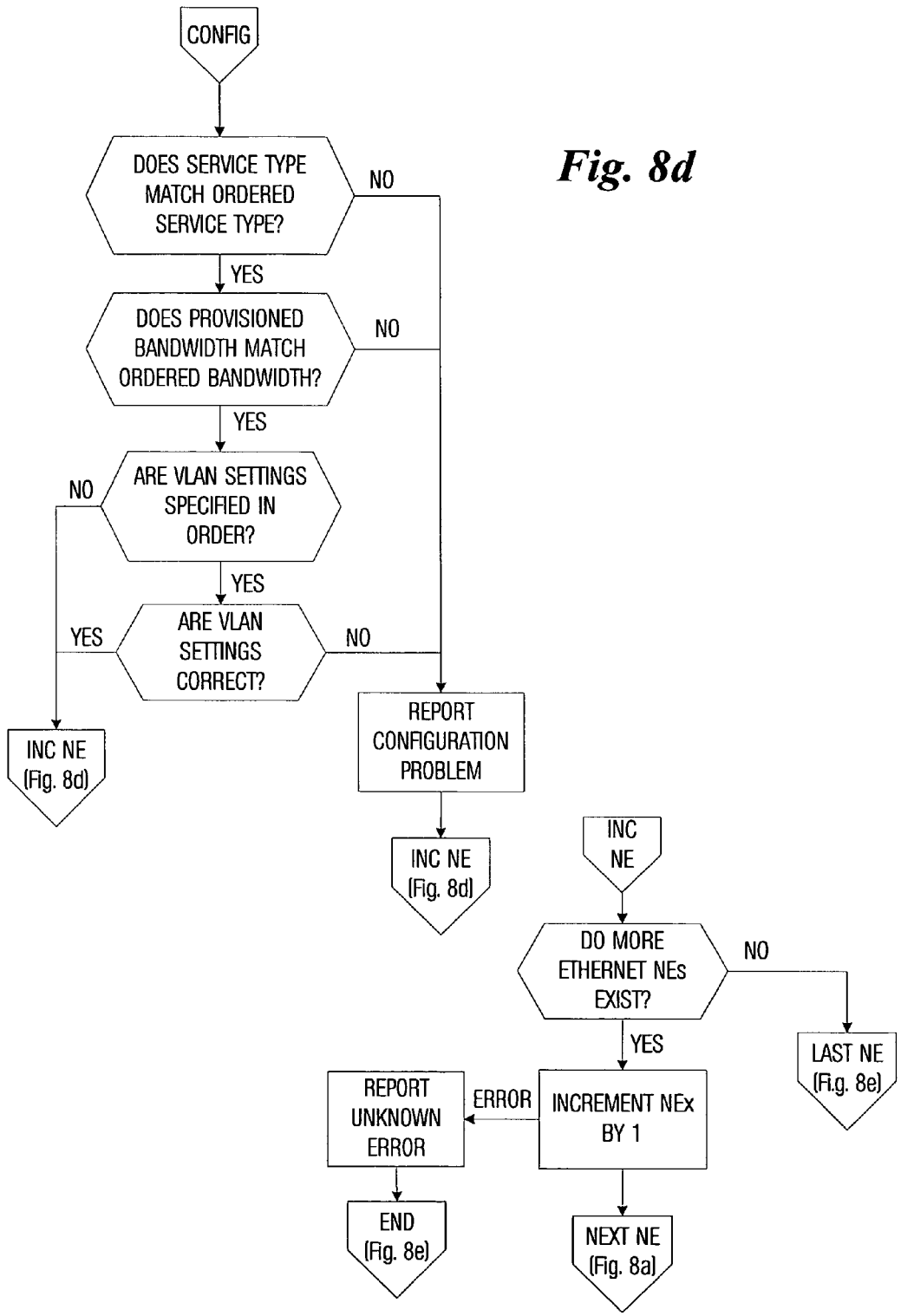
Figure 8E:
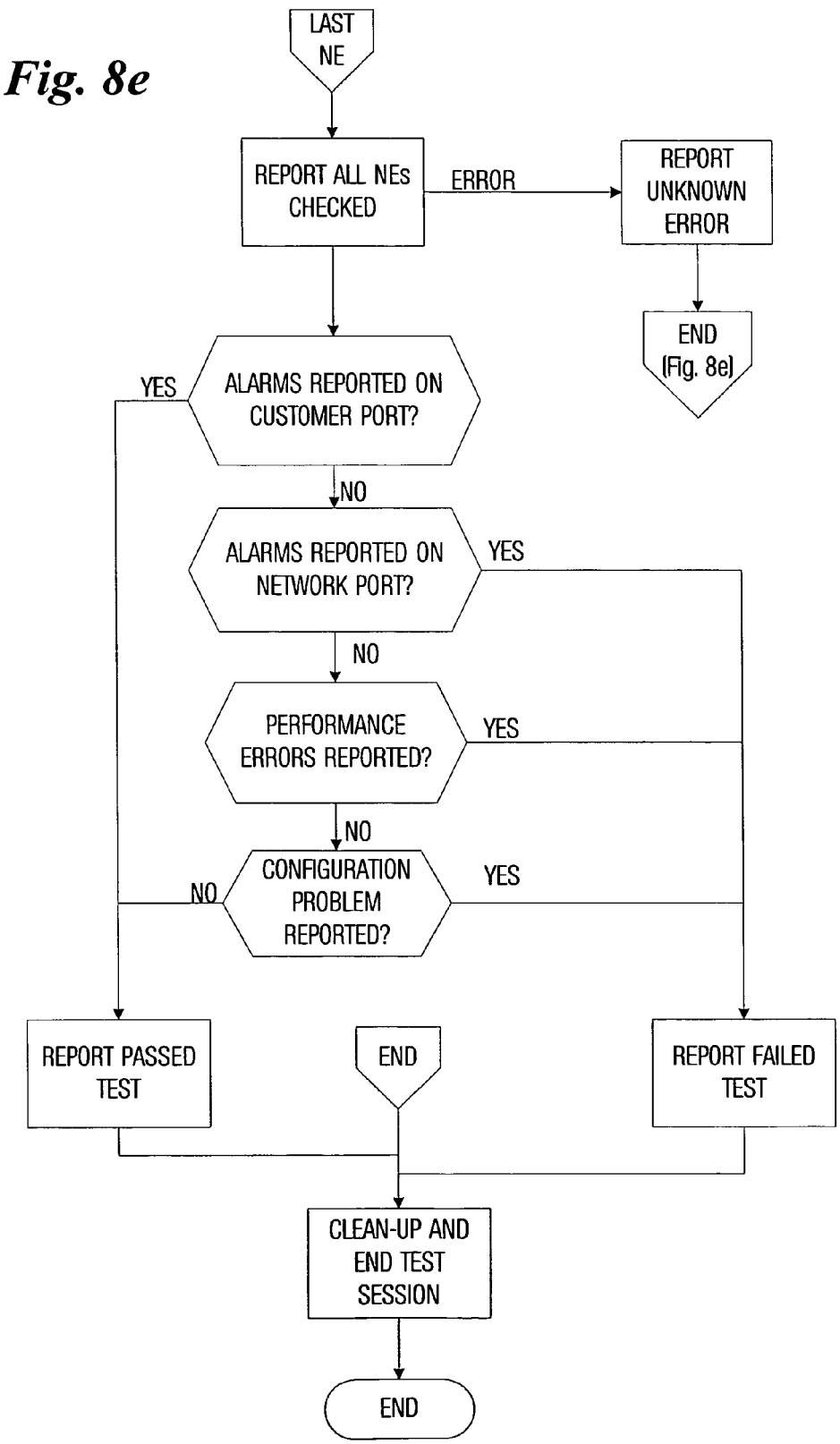
Figure 9A:
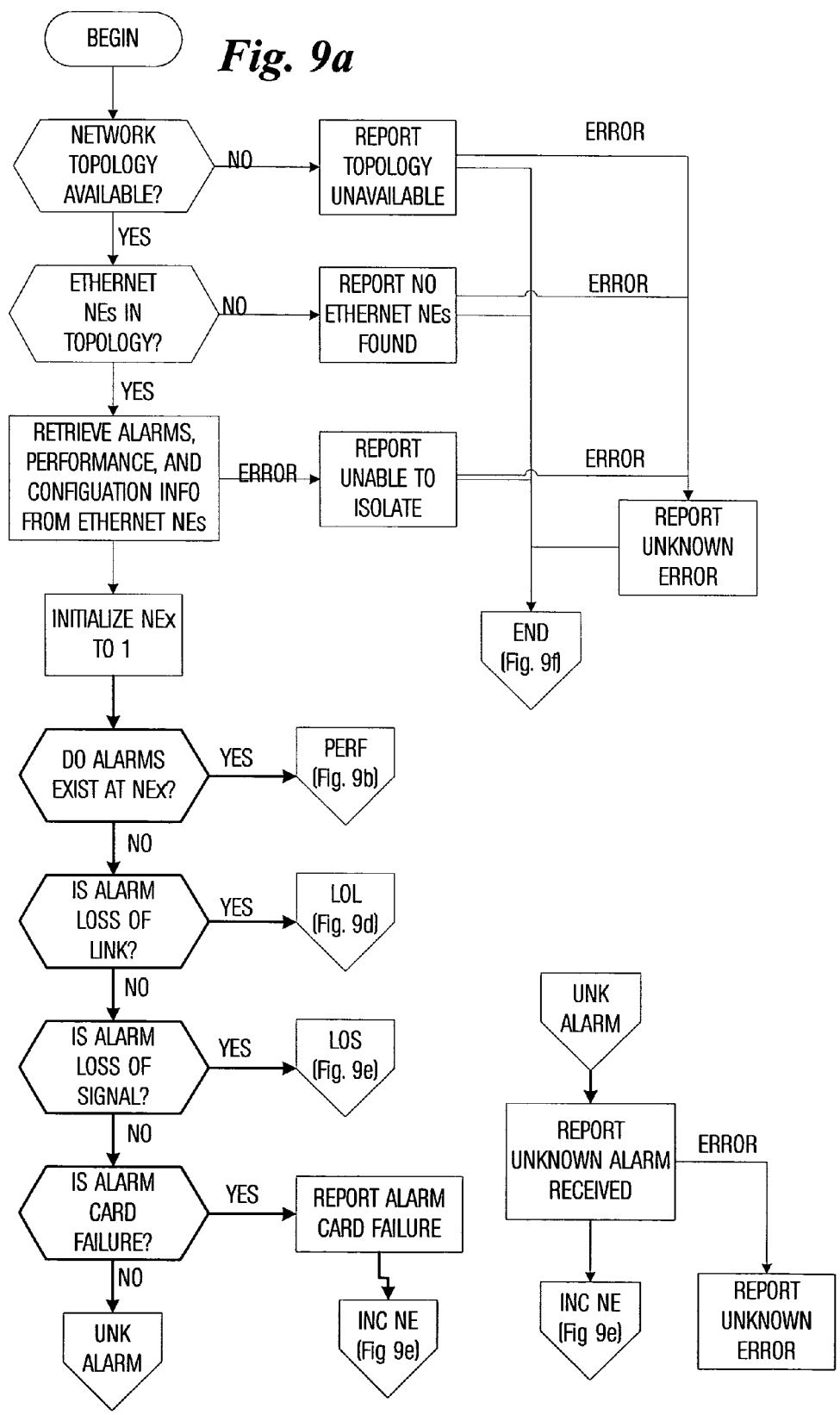
FIGS. 9a-9f illustrate steps that may be performed by a control system to test the functionality of a service in accordance with one embodiment of the present invention.
Figure 9B:
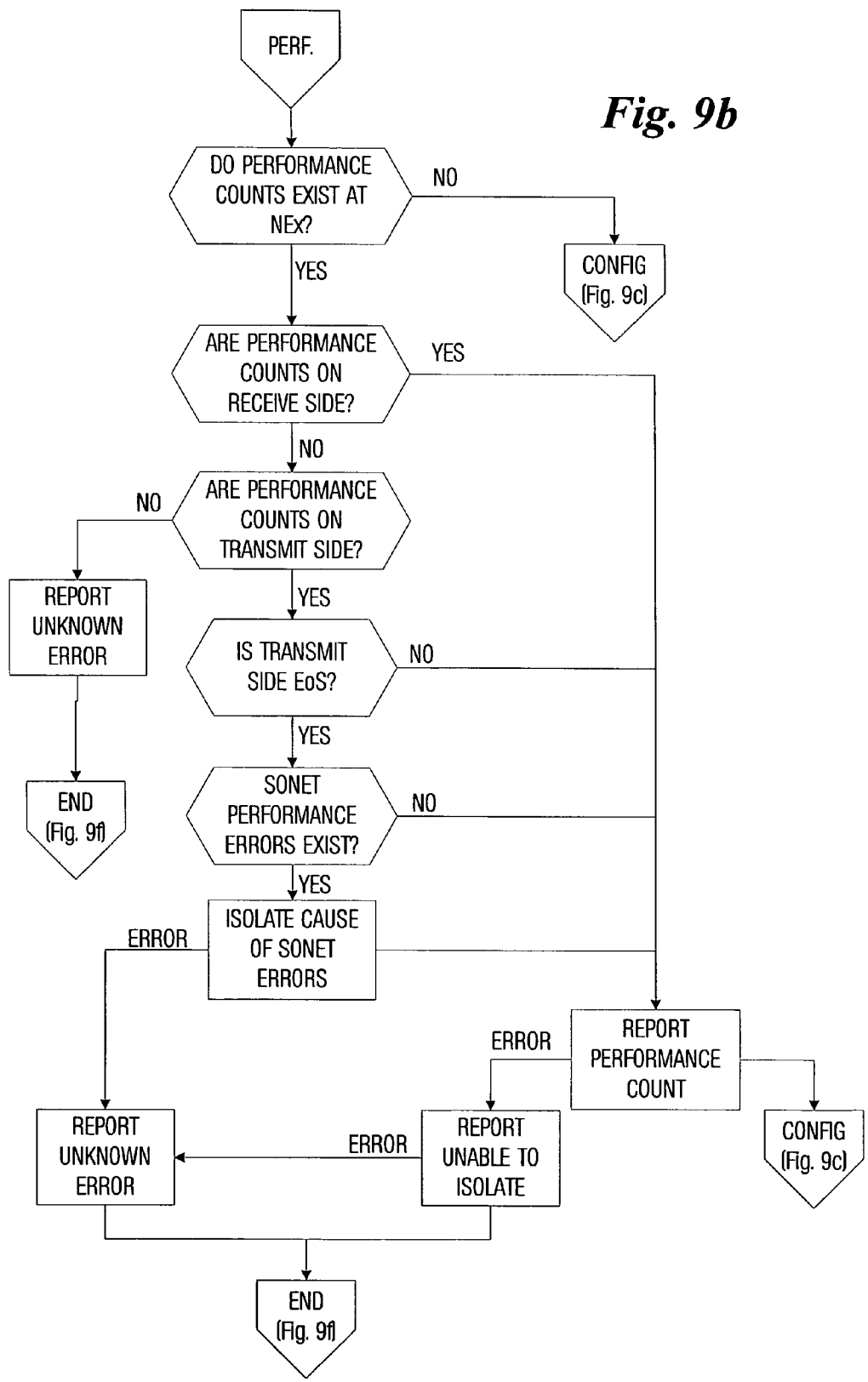
Figure 9C:
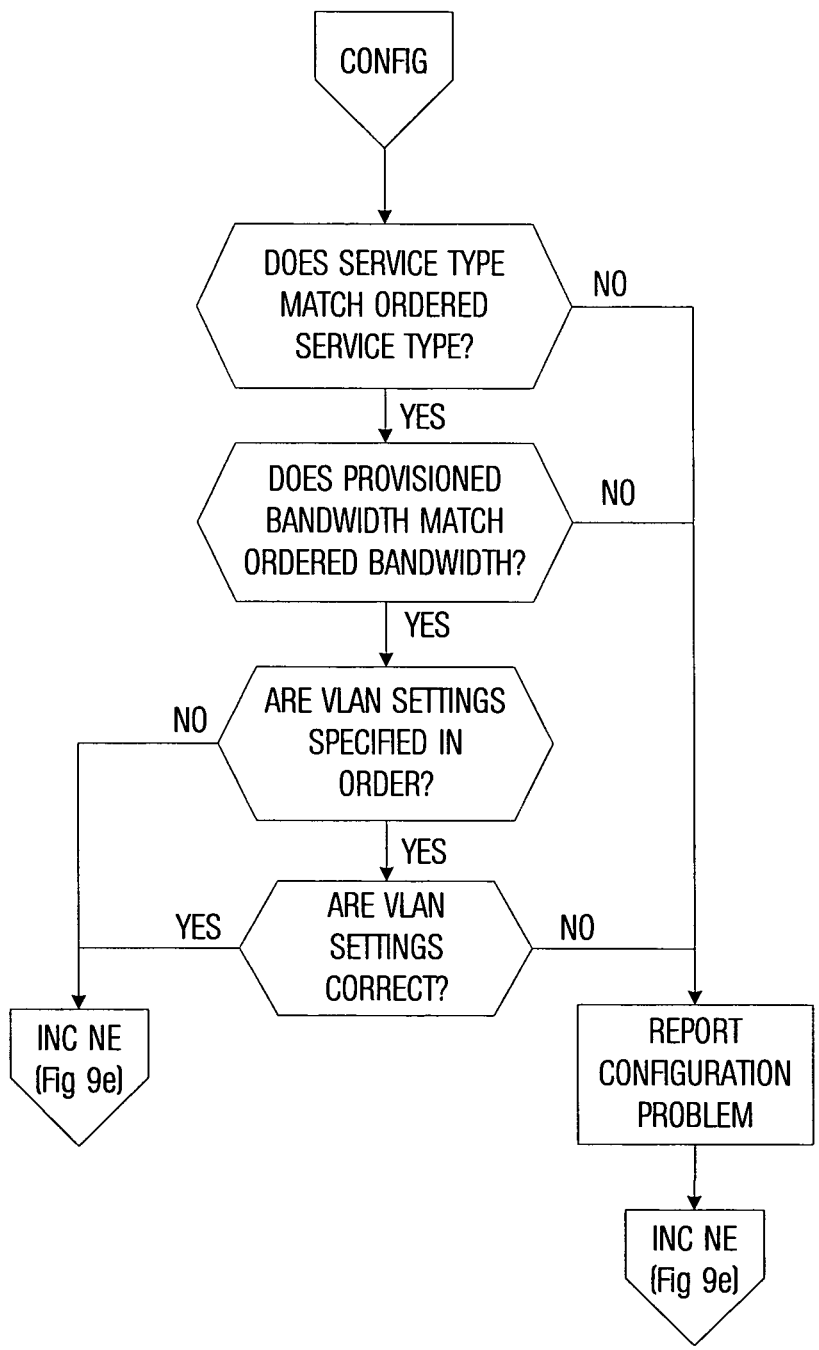
Figure 9D:
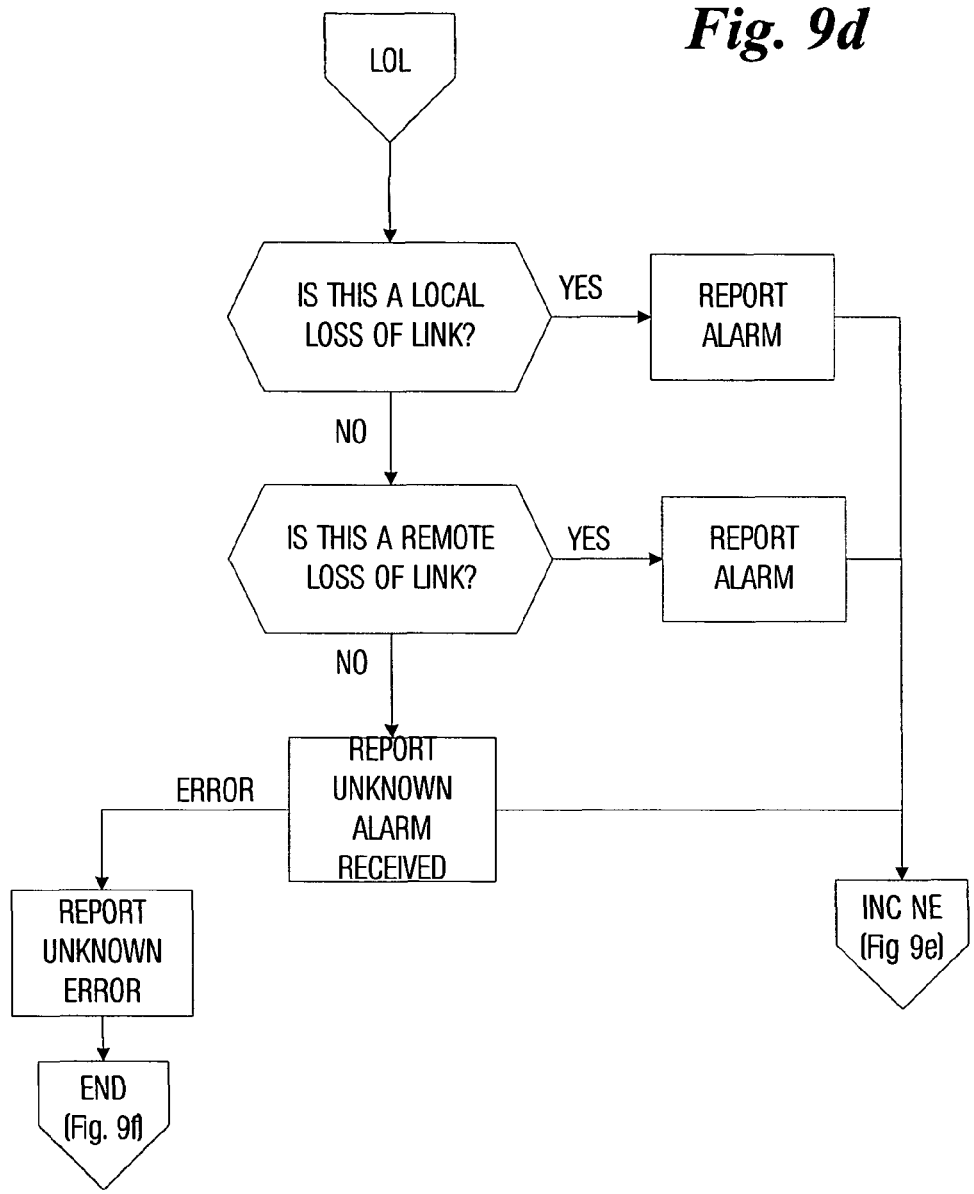
Figure 9E:
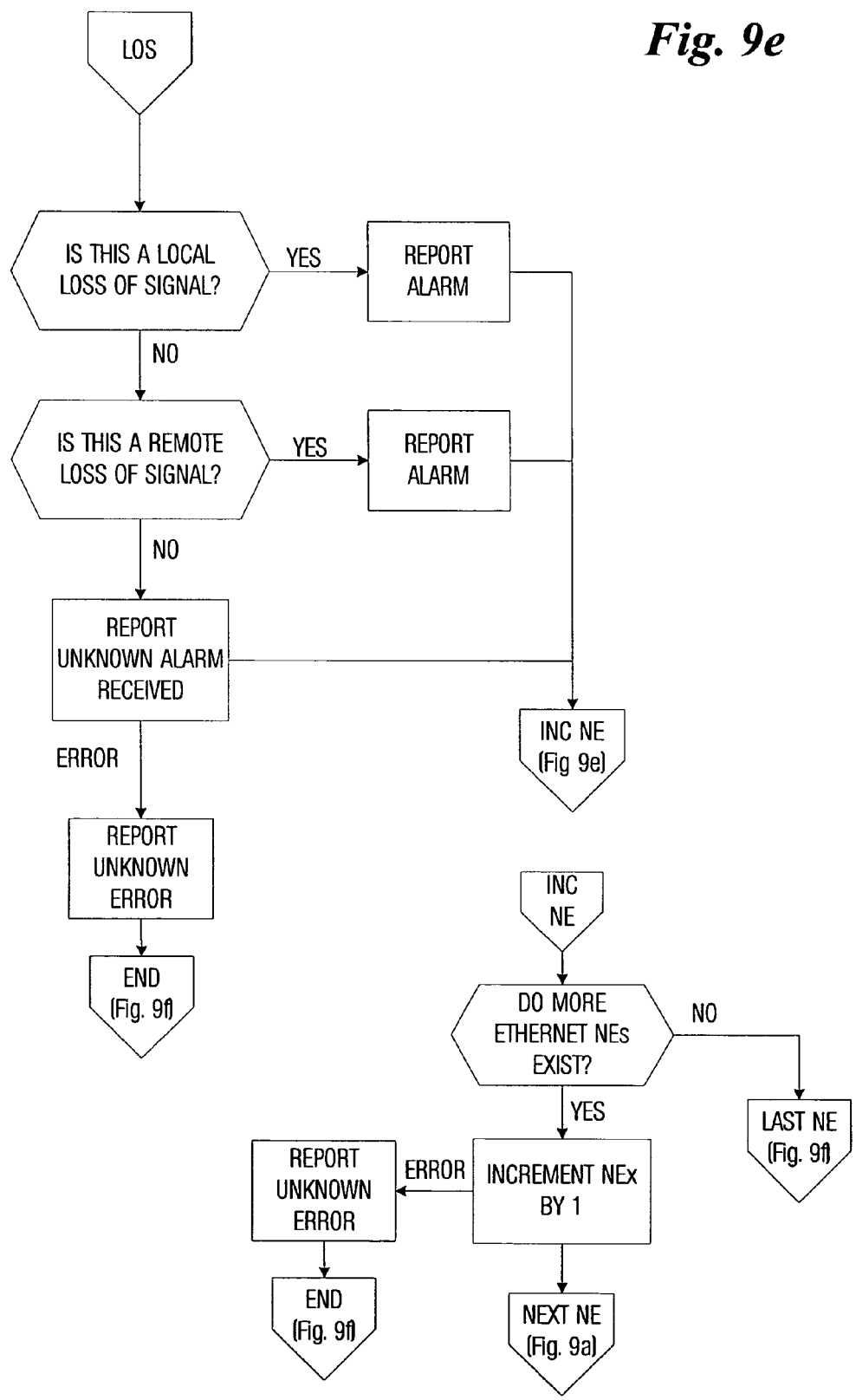
Figure 9F:
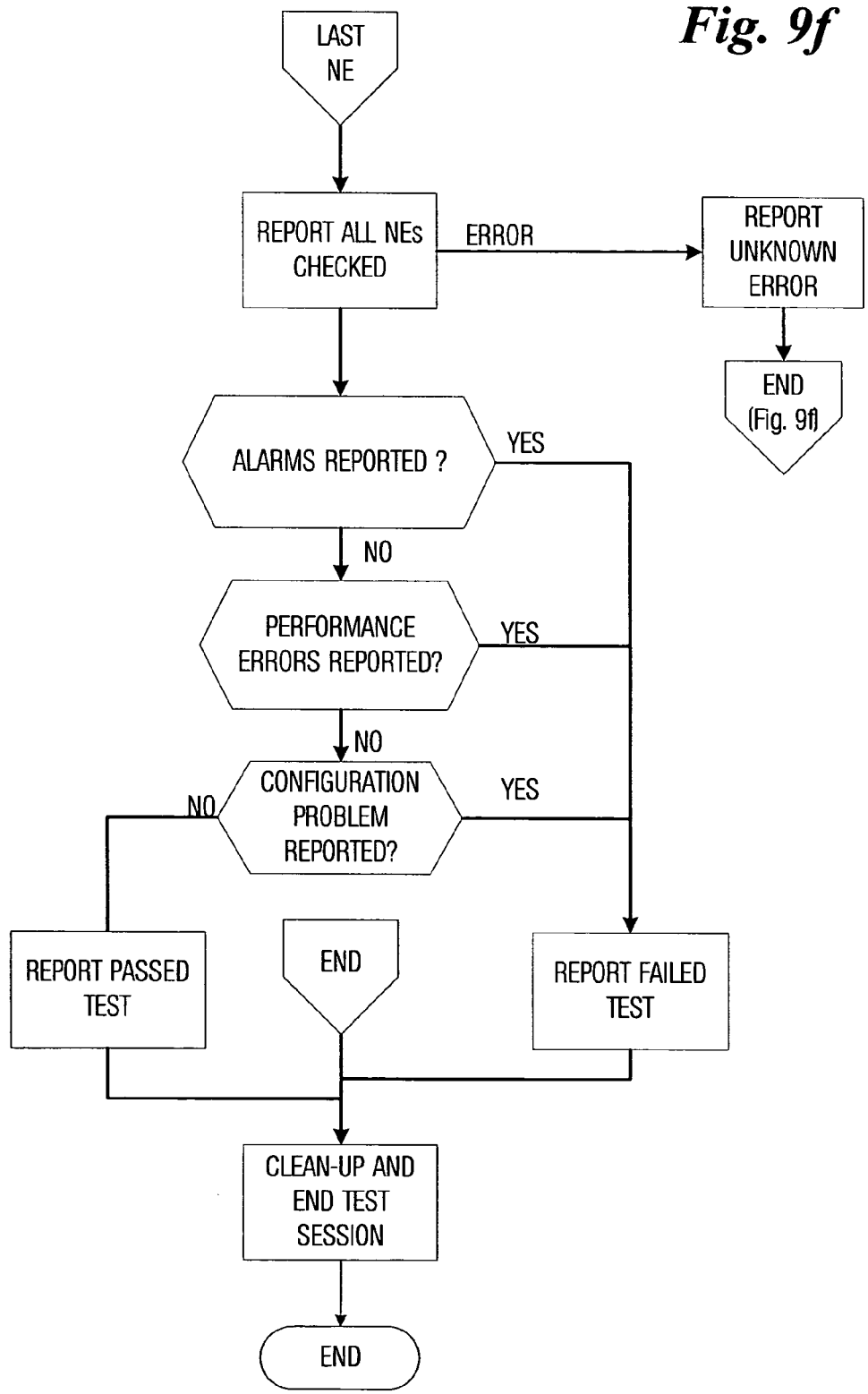

The "config" routine, illustrated in FIG. 8d, checks to determine if the configured service type and bandwidth matches the customer order, and if the VLAN settings are correct and in the specified order. If any problems are detected, a configuration problem is reported. Otherwise, the script proceeds on to the next network element in the sequence. FIG. 8e illustrates the final portion of the installation script, where the test is reported as either passed or failed, and the test session is ended.

In addition to performing an automated test routine at installation, it may be advantageous to perform an automated test routine as part of a normal maintenance function. For example, if during normal operation of the network an error is reported, the automated test routine could assist in isolating the problem down to a specific network element, a card within the network element, or a link between network elements.

Once the problem is isolated, a service order can be automatically issued to dispatch a work crew to perform the necessary maintenance, for example. An exemplary maintenance test script is illustrated by FIGS. 9a-9f, collectively referred to as FIG. 9.

The functions performed by the test scripts illustrated in FIGS. 8 and 9 are substantially similar, with the main difference being the manner in which an error at the customer equipment is handled. During a test just after installation, it is assumed that the customer's port may not be connected. A service provider may want to verify the operation of the service provider's portion of the network, checking that everything has been connected and provisioned properly, prior to connecting the customer. Therefore, an alarm and/or error is expected at the customer port, and would be ignored. This is depicted in FIG. 8e, at the step "alarms reported on customer port." Even if an alarm is reported on the customer port, the test is reported to have passed. This is in contrast to the maintenance test script, which would report any alarm and/or error at the customer port. During a maintenance test, the customer port is connected and could be a source of the problem, therefore problems at the customer port would be reported. This is depicted in FIG. 9f, at the step labeled "alarms reported?". The test is reported as failed for any type of alarm, and a distinction is not made between a customer or a non-customer alarm.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that functionality provided by the management and control VLAN may be provided by other mechanisms and that the network topology may vary while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An access device comprising:
a first port configured to communicatively couple to a network node via a first communications link, the first communications link having a plurality of flows, at least one of the flows being configured as a maintenance and control flow, comprising a non-dedicated VLAN, and at least one of the flows being configured to carry customer data;
a second port configured to communicatively couple to one or more demarcation devices via a second communications link, the demarcation devices being communicatively coupled to one or more customer premise equipment (CPE); and a processing unit configured to transmit communications between the first port and the second port and configured to respond to commands received in the maintenance and control flow and to transmit access device information on the maintenance and control flow, wherein the access device is configured to transmit management information via an in-band management channel on the first port;

wherein the access device is further configured to block attempts from the second port to access the processing unit; and wherein a VLAN header encapsulates maintenance and control messages in the maintenance and control flow, and the VLAN header includes a flow identifier and a VLAN identifier for specifying a maintenance and control VLAN and specifying the first and second ports as a combination of a shelf identifier, card identifier, and port identifier.

2. The access device of claim 1, wherein the flower identifier specifies the VLAN identifier, and the first port is configured to communicate to an access network via an optical link.

3. The access device of claim 2, wherein the optical link is a DS-3 link.

4. The access device of claim 1, wherein the second communications link is an Ethernet link.

5. The access device of claim 1, wherein the first port is communicatively coupled to an add/drop multiplexer.

6. The access device of claim 1, wherein the VLAN utilizes VLAN identifier 4095.

7. The access device of claim 1, wherein the access device information includes at least one of performance data, configuration data, and status data.

8. The access device of claim 1, wherein the processing unit is further configured to retrieve demarcation device information from at least one of the demarcation devices.

9. The access device of claim 8, wherein the demarcation device information includes at least one of performance data, configuration data, and status data.

10. The access device of claim 1, wherein the processing unit is further configured to receive configuration commands via the maintenance and control flow and the first communications link is a non-dedicated communications link.

11. The access device of claim 1, wherein the processing unit is further configured to initiate transfer of management information via the maintenance and control flow.

12. The access device of claim 11, wherein the processing unit is further configured to transfer management information upon the occurrence of a first event or periodically.

13. The access device of claim 1, wherein the processing unit is further configured to detect equipment communicatively coupled to the access device and to transmit an indication of the detected equipment on the first port via the processing unit.

14. The access device of claim 1, further comprising:
a demarcation device manager for controlling communication between the one or more demarcation devices and the access device.

15. The access device of claim 1, wherein the VLAN header further includes an access device identifier for uniquely identifying the access device on the control and maintenance VLAN.

16. An access device for providing customer premise equipment access to an access network, the access device comprising:
a first port configured to communicatively couple to the access network;

a second port configured to communicatively couple to one or more demarcation devices that are communicatively coupled to one or more customer premise equipment (CPE); and a processing unit configured for performing the steps of:
communicating via a first communications link coupled to the first port, the first communications link having a plurality of flows;
establishing an in-band management flow in the first communications link, the in-band management flow being a VLAN and the first communications link being a non-dedicated communications link;
establishing one or more customer flows in the first communications link; and
transmitting access device information via the in-band management flow;

wherein the processing unit is further configured to block attempts from the second port to access the in-band management flow; and wherein a VLAN header encapsulates maintenance and control messages in a maintenance and control flow, and the VLAN header includes a flow identifier and a VLAN identifier for specifying a maintenance and control VLAN and specifying the first and second ports as a combination of a shelf identifier, card identifier, and port identifier.

17. The access device of claim 16, wherein the processing unit is further configured for reporting via the in-band management flow demarcation device information to the network element.

18. The access device of claim 17, wherein the access device information and the demarcation device information includes at least one of performance data, configuration data, and status data.

19. The access device of claim 16, wherein the first port is configured to be coupled to an optical link.

20. The access device of claim 16, wherein the second port is configured to be coupled to an Ethernet link.

21. The access device of claim 16, wherein the VLAN uses a VLAN identifier of 4095.

22. The access device of claim 16, wherein the processing unit is further configured for receiving configuration commands via the in-band management flow over a non-dedicated communications link.

23. The access device of claim 16, wherein the processing unit is further configured for initiating the transfer of access device information on the first port via the in-band management flow.

24. The access device of claim 23, wherein the access device is configured to transfer management information upon the occurrence of a first event or periodically.

25. The access device of claim 16, wherein the processing unit is further configured for detecting equipment communicatively coupled to the access device and transmitting an indication of the detected equipment on the first port via the in-band management flow.

26. A control system in a telecommunications network, the control system comprising:
a first port configured to communicatively couple to the telecommunications network; and
a processing unit configured for performing the steps of:
establishing a communications link over the telecommunications network to an access device, the access device being communicatively coupled, via a second port, to one or more demarcation devices, the communications link having a plurality of flows, and at least one of the flows configured to transmit customer data;

establishing an in-band management flow via the communications link, the in-band management flow being via a non-dedicated VLAN; and receiving management information from the access device via the in-band management flow on the first port;

wherein the processing unit is further configured to block attempts from the second port to access the in-band management flow; and wherein a VLAN header encapsulates maintenance and control messages in a maintenance and control flow, and the VLAN header includes a flow identifier and a VLAN identifier for specifying a maintenance and control VLAN and specifying the first and second ports as a combination of a shelf identifier, card identifier, and port identifier.

27. The control system of, claim 26, wherein the VLAN utilizes a VLAN identifier of 4095.

28. The control system of claim 26, wherein the communications link comprises a packet-based communications link and the telecommunications network includes a packet-switched network.

29. The control system of claim 26, wherein the management information includes at least one of performance data, configuration data, and status data.

30. The control system of claim 26, wherein the processing unit is further configured to retrieve demarcation device information from at least one of the demarcation devices.

31. The control system of claim 30, wherein the demarcation device information includes at least one of performance data, configuration data, and status data.

32. The control system of claim 26, wherein the processing unit is further configured to transmit configuration commands to the access device via the in-band management flow.

* * * * *